US010983682B2

(12) United States Patent
Leonard et al.

(10) Patent No.: US 10,983,682 B2
(45) Date of Patent: Apr. 20, 2021

(54) INTERACTIVE GRAPHICAL USER-INTERFACE FOR ANALYZING AND MANIPULATING TIME-SERIES PROJECTIONS

(71) Applicant: SAS Institute Inc., Cary, NC (US)

(72) Inventors: Michael James Leonard, Cary, NC (US); Jie Zhong, Cary, NC (US); Kyungduck Cha, Cary, NC (US); Rajendra Singh Solanki, Cary, NC (US); Rajib Nath, Pune (IN); Macklin Frazier, Cary, NC (US); Li Xu, Cary, NC (US)

(73) Assignee: SAS INSTITUTE INC., Cary, NC (US)

( * ) Notice: Subject to any disclaimer, the term of this patent is extended or adjusted under 35 U.S.C. 154(b) by 317 days.

(21) Appl. No.: 15/976,052

(22) Filed: May 10, 2018

(65) Prior Publication Data

US 2018/0260106 A1    Sep. 13, 2018

Related U.S. Application Data

(63) Continuation-in-part of application No. 15/146,697, filed on May 4, 2016.
(Continued)

(30) Foreign Application Priority Data

May 11, 2017    (IN) .............................. 201711016630

(51) Int. Cl.
*G06F 3/0484*    (2013.01)
*G06T 11/20*    (2006.01)
(Continued)

(52) U.S. Cl.
CPC ........ *G06F 3/04847* (2013.01); *G06F 3/0482* (2013.01); *G06F 16/2462* (2019.01);
(Continued)

(58) Field of Classification Search
None
See application file for complete search history.

(56) References Cited

U.S. PATENT DOCUMENTS 5,461,699 A    10/1995 Arbabi et al.
5,559,895 A    9/1996 Lee et al.
(Continued)

FOREIGN PATENT DOCUMENTS

WO    2005/124718 A2    12/2005

OTHER PUBLICATIONS

Gulbis, J., "Data Visualization—Howto Pick the Right Chart Type," <eazybi.com/blog/data_visualization_and_chart_types/> (Mar. 2016) 25 pp. (Year: 2016).*
(Continued)

*Primary Examiner* — Brian M Smith
(74) *Attorney, Agent, or Firm* — Kilpatrick Townsend & Stockton LLP

(57) ABSTRACT

Time-series projections can be analyzed and manipulated via an interactive graphical user interface generated by a system. The graphical user interface can include a graph depicting an aggregated time-series projection (ATSP) over a future time. The ATSP can be generated by aggregating multiple time-series. The system can receive user input indicating that an existing value in the ATSP is to be overridden with an override value. In response, the system can adjust the ATSP using the override value to generate an updated version of the ATSP. The system can display the updated version of the ATSP in the graphical user interface. The system can also propagate the impact of overriding the
(Continued)

existing value with the override value through the multiple time-series. The system can display an impact analysis portion within the graphical user interface indicating the impact of overriding the existing value with the override value on the multiple time-series.

30 Claims, 18 Drawing Sheets

Related U.S. Application Data

(60) Provisional application No. 62/559,149, filed on Sep. 15, 2017, provisional application No. 62/210,763, filed on Aug. 27, 2015.

(51) Int. Cl.
*G06F 3/0482* (2013.01)
*G06N 20/00* (2019.01)
*G06F 16/2458* (2019.01)

(52) U.S. Cl.
CPC ............ *G06T 11/206* (2013.01); *G06N 20/00* (2019.01); *G06T 2200/24* (2013.01)

(56) References Cited

U.S. PATENT DOCUMENTS

| | | |
|---|---|---|
| 5,615,109 A | 3/1997 | Eder |
| 5,870,746 A | 2/1999 | Knutson et al. |
| 5,918,232 A | 6/1999 | Pouschine et al. |
| 5,926,822 A | 7/1999 | Garman |
| 5,953,707 A | 9/1999 | Huang et al. |
| 5,991,740 A | 11/1999 | Messer |
| 5,995,943 A | 11/1999 | Bull et al. |
| 6,052,481 A | 4/2000 | Grajski et al. |
| 6,128,624 A | 10/2000 | Papierniak et al. |
| 6,151,582 A | 11/2000 | Huang et al. |
| 6,151,584 A | 11/2000 | Papierniak et al. |
| 6,169,534 B1 | 1/2001 | Raffel et al. |
| 6,189,029 B1 | 2/2001 | Fuerst |
| 6,208,975 B1 | 3/2001 | Bull et al. |
| 6,216,129 B1 | 4/2001 | Eldering |
| 6,223,173 B1 | 4/2001 | Wakio et al. |
| 6,230,064 B1 | 5/2001 | Nakase et al. |
| 6,286,005 B1 | 9/2001 | Cannon |
| 6,308,162 B1 | 10/2001 | Ouimet et al. |
| 6,317,731 B1 | 11/2001 | Luciano |
| 6,334,110 B1 | 12/2001 | Walter et al. |
| 6,356,842 B1 | 3/2002 | Intriligator et al. |
| 6,397,166 B1 | 5/2002 | Leung et al. |
| 6,400,853 B1 | 6/2002 | Shiiyama |
| 6,526,405 B1 | 2/2003 | Mannila et al. |
| 6,539,392 B1 | 3/2003 | Rebane |
| 6,542,869 B1 | 4/2003 | Foote |
| 6,564,190 B1 | 5/2003 | Dubner |
| 6,570,592 B1 | 5/2003 | Sajdak et al. |
| 6,591,255 B1 | 7/2003 | Tatum et al. |
| 6,611,726 B1 | 8/2003 | Crosswhite |
| 6,640,227 B1 | 10/2003 | Andreev |
| 6,662,185 B1 | 12/2003 | Stark et al. |
| 6,735,738 B1 | 5/2004 | Kojima |
| 6,775,646 B1 | 8/2004 | Tufillaro et al. |
| 6,792,399 B1 | 9/2004 | Phillips et al. |
| 6,850,871 B1 | 2/2005 | Barford et al. |
| 6,876,988 B2 | 4/2005 | Helsper et al. |
| 6,878,891 B1 | 4/2005 | Josten et al. |
| 6,928,398 B1 | 8/2005 | Fang et al. |
| 6,978,249 B1 | 12/2005 | Beyer et al. |
| 7,072,863 B1 | 7/2006 | Phillips et al. |
| 7,080,026 B2 | 7/2006 | Singh et al. |
| 7,103,222 B2 | 9/2006 | Peker |
| 7,130,822 B1 | 10/2006 | Their et al. |
| 7,130,833 B2 | 10/2006 | Kashima et al. |
| 7,171,340 B2 | 1/2007 | Brocklebank |
| 7,194,434 B2 | 3/2007 | Piccioli |
| 7,216,088 B1 | 5/2007 | Chappel et al. |
| 7,222,082 B1 | 5/2007 | Adhikari et al. |
| 7,236,940 B2 | 6/2007 | Chappel |
| 7,240,019 B2 | 7/2007 | Delurgio et al. |
| 7,251,589 B1 | 7/2007 | Crowe et al. |
| 7,260,550 B1 | 8/2007 | Notani |
| 7,280,986 B2 | 10/2007 | Goldberg et al. |
| 7,433,834 B2 | 10/2008 | Joao |
| 7,523,048 B1 | 4/2009 | Dvorak |
| 7,530,025 B2 | 5/2009 | Ramarajan et al. |
| 7,562,062 B2 | 7/2009 | Ladde et al. |
| 7,565,417 B2 | 7/2009 | Rowady, Jr. |
| 7,570,262 B2 | 8/2009 | Landau et al. |
| 7,610,214 B1 | 10/2009 | Dwarakanath et al. |
| 7,617,167 B2 | 11/2009 | Griffis et al. |
| 7,660,734 B1 | 2/2010 | Neal et al. |
| 7,689,456 B2 | 3/2010 | Schroeder et al. |
| 7,693,737 B2 | 4/2010 | Their et al. |
| 7,702,482 B2 | 4/2010 | Graepel et al. |
| 7,711,734 B2 | 5/2010 | Leonard et al. |
| 7,716,022 B1 | 5/2010 | Park et al. |
| 7,987,106 B1 | 7/2011 | Aykin |
| 8,005,707 B1 | 8/2011 | Jackson et al. |
| 8,010,324 B1 | 8/2011 | Crowe et al. |
| 8,010,404 B1 | 8/2011 | Wu et al. |
| 8,073,729 B2 | 12/2011 | Kisin et al. |
| 8,112,302 B1 | 2/2012 | Trovero et al. |
| 8,326,677 B1 | 12/2012 | Fan et al. |
| 8,364,517 B2 | 1/2013 | Trovero et al. |
| 8,392,228 B2 | 3/2013 | Mulukutla et al. |
| 8,489,622 B2 | 7/2013 | Joshi et al. |
| 8,631,040 B2 | 1/2014 | Jackson et al. |
| 8,935,198 B1 * | 1/2015 | Phillips ................. G06Q 40/00 706/62 |
| 9,037,998 B2 | 5/2015 | Leonard et al. |
| 9,087,306 B2 | 7/2015 | Leonard et al. |
| 9,147,218 B2 | 9/2015 | Leonard et al. |
| 9,208,209 B1 * | 12/2015 | Katz ..................... G06N 5/025 |
| 9,239,854 B2 * | 1/2016 | Rausch ............ G06F 17/30292 |
| 9,244,887 B2 | 1/2016 | Leonard et al. |
| 9,418,339 B1 | 8/2016 | Leonard et al. |
| 9,804,726 B1 * | 10/2017 | Joos ........................ G06F 3/048 |
| 9,818,063 B2 | 11/2017 | Joshi et al. |
| 9,916,282 B2 | 3/2018 | Leonard et al. |
| 10,255,085 B1 * | 4/2019 | Valsaraj ................. G06N 20/20 |
| 2001/0013008 A1 | 8/2001 | Waclawski |
| 2002/0052758 A1 | 5/2002 | Arthur et al. |
| 2002/0169657 A1 | 11/2002 | Singh et al. |
| 2003/0101009 A1 | 5/2003 | Seem |
| 2003/0105660 A1 | 6/2003 | Walsh et al. |
| 2003/0110016 A1 | 6/2003 | Stefek et al. |
| 2003/0154144 A1 | 8/2003 | Pokorny et al. |
| 2003/0187719 A1 | 10/2003 | Brocklebank |
| 2003/0200134 A1 | 10/2003 | Leonard et al. |
| 2003/0212590 A1 | 11/2003 | Klingler |
| 2004/0041727 A1 | 3/2004 | Ishii et al. |
| 2004/0172225 A1 | 9/2004 | Hochberg et al. |
| 2005/0055275 A1 | 3/2005 | Newman et al. |
| 2005/0102107 A1 | 5/2005 | Porikli |
| 2005/0114391 A1 | 5/2005 | Corcoran et al. |
| 2005/0159997 A1 | 7/2005 | John |
| 2005/0177351 A1 | 8/2005 | Goldberg et al. |
| 2005/0209732 A1 | 9/2005 | Audimoolam et al. |
| 2005/0249412 A1 | 11/2005 | Radhakrishnan et al. |
| 2005/0271156 A1 | 12/2005 | Nakano |
| 2006/0063156 A1 | 3/2006 | Willman et al. |
| 2006/0064181 A1 | 3/2006 | Kato |
| 2006/0085380 A1 | 4/2006 | Cote et al. |
| 2006/0112028 A1 | 5/2006 | Xiao et al. |
| 2006/0143081 A1 | 6/2006 | Argaiz |
| 2006/0164997 A1 | 7/2006 | Graepel et al. |
| 2006/0241923 A1 | 10/2006 | Xu et al. |
| 2006/0247859 A1 | 11/2006 | Ladde et al. |
| 2006/0247900 A1 | 11/2006 | Brocklebank |
| 2007/0011175 A1 | 1/2007 | Langseth et al. |
| 2007/0094168 A1 | 4/2007 | Ayala et al. |
| 2007/0106550 A1 | 5/2007 | Umblijs et al. |
| 2007/0118491 A1 | 5/2007 | Baum et al. |

(56) References Cited

U.S. PATENT DOCUMENTS

| | | |
|---|---|---|
| 2007/0162301 A1 | 7/2007 | Sussman et al. |
| 2007/0203783 A1 | 8/2007 | Beltramo |
| 2007/0208492 A1 | 9/2007 | Downs et al. |
| 2007/0208608 A1 | 9/2007 | Amerasinghe et al. |
| 2007/0291958 A1 | 12/2007 | Jehan |
| 2008/0097802 A1 | 4/2008 | Ladde et al. |
| 2008/0208832 A1 | 8/2008 | Friedlander et al. |
| 2008/0270363 A1 | 10/2008 | Hunt et al. |
| 2008/0288537 A1 | 11/2008 | Golovchinsky et al. |
| 2008/0288889 A1* | 11/2008 | Hunt ............... G06Q 30/02 715/810 |
| 2008/0294651 A1 | 11/2008 | Masuyama et al. |
| 2009/0018996 A1 | 1/2009 | Hunt et al. |
| 2009/0172035 A1 | 7/2009 | Lessing et al. |
| 2009/0319310 A1 | 12/2009 | Little |
| 2010/0030521 A1 | 2/2010 | Akhrarov et al. |
| 2010/0063974 A1 | 3/2010 | Papadimitriou et al. |
| 2010/0114899 A1 | 5/2010 | Guha et al. |
| 2010/0257133 A1 | 10/2010 | Crowe et al. |
| 2011/0119374 A1 | 5/2011 | Ruhl et al. |
| 2011/0145223 A1 | 6/2011 | Cormode et al. |
| 2011/0208701 A1 | 8/2011 | Jackson et al. |
| 2011/0307503 A1 | 12/2011 | Dlugosch |
| 2012/0053989 A1 | 3/2012 | Richard |
| 2012/0271748 A1* | 10/2012 | DiSalvo ............... G06Q 40/04 705/37 |
| 2013/0024167 A1 | 1/2013 | Blair et al. |
| 2013/0024173 A1 | 1/2013 | Brzezicki et al. |
| 2013/0238399 A1* | 9/2013 | Chipley ............... G06Q 10/06 705/7.37 |
| 2013/0268318 A1 | 10/2013 | Richard |
| 2014/0019088 A1 | 1/2014 | Leonard et al. |
| 2014/0019448 A1 | 1/2014 | Leonard et al. |
| 2014/0019909 A1 | 1/2014 | Leonard et al. |
| 2014/0257778 A1 | 9/2014 | Leonard et al. |
| 2015/0120263 A1 | 4/2015 | Brzezicki et al. |
| 2016/0292324 A1 | 10/2016 | Leonard et al. |

OTHER PUBLICATIONS

Beran, B., "Multivariate Forecasting in Tableau with R," downloaded from <boraberan.wordpress.com/2016/08/01/multivariate-forecasting-in-tableau-with-r> (Aug. 1, 2016) 7 pp. (Year: 2016).*

Alali, N. et al., "Neural network meta-modeling of steam assisted gravity drainage oil recover process" Iranaian Journal of Chemistry and Chemical Engineering (IJCCE) vol. 29. No. 3 (2010) pp. 109-122.

Kang, P. et al., "A virtual metrology system for semiconductor manufacturing" Expert Systems with Applications, vol. 36. No. 10 (2009) pp. 12554-12561.

Albertos, P. et al., "Virtual sensors for control applications" Annual Reviews in Control, vol. 26, No. 1 (2002) pp. 101-112.

SAS Institute Inc., 2012, SAS(R) 9.3 Language Refrence: Concepts, Second Edition, Cary, NC: SAS Institute, Inc. [retrieved from https://support.sas.com/documentation/cdl/en/lrcon/65287/PDF/default/lrcon.pdf] pp. 1,2,395,396,408,411,419.

Trovero, M. A., Joshi, M. V., and Leonard, M. J. 2007. "Efficient Reconciliation of a Hierarchy of Forecasts in Presence of Constraints." Proceedings of the SAS Global Forum 2007 Conference. Cary, NC. SAS Institute Inc., downloaded from http://www2.sas.com/proceedings/forum2007/277-2007.pdf 1 page.

Leonard, M. J., and Elsheimer, B. M. 2015. "Count Series Forecasting." Proceedings of the SAS Global Forum 2015 Conference. Cary, NC. SAS Institute Inc., downloaded from http://support.sas.com/resources/papers/proceedings15/SAS1754-2015.pdf 14 pages.

Leonard, M. J. "Large-Scale Automatic Forecasting: Millions of Forecasts." International Symposium of Forecasting. Dublin (2002) 9 pages.

IBM "IBM SPSS Forecasting 22" (2013) 32 pages.

Aiolfi, Marco et al., "Forecast Combinations," Creates Research Paper 2010-21, School of Economics and Management, Aarhus University, 35 pp. (May 6, 2010).

Automatic Forecasting Systems Inc., Autobox 5.0 for Windows User's Guide, 82 pp. (1999).

Choudhury, J. Paul et al., "Forecasting of Engineering Manpower Through Fuzzy Associative Memory Neural Network with ARIMA: A Comparative Study", Neurocomputing, vol. 47, Iss. 1-4, pp. 241-257 (Aug. 2002).

Costantini, Mauro et al., "Forecast Combination Based on Multiple Encompassing Tests in a Macroeconomic DSGE System," Reihe Okonomie/ Economics Series 251, 24 pp. (May 2010).

Data Mining Group, available at http://www.dmg.org, printed May 9, 2005, 3 pp.

Funnel Web, Web site Analysis. Report, Funnel Web Demonstration, Authenticated Users History, http://www.quest.com/funnel.sub.--web/analyzer/sample/UserHist.html (1 pg.), Mar. 2002.

Funnel Web, Web site Analysis Report, Funnel Web Demonstration, Clients History, http://www/quest.com/funnel.sub.--web/analyzer/sample.ClientHist- .html (2 pp.), Mar. 2002.

Garavaglia, Susan et al., "A Smart Guide to Dummy Variables: Four Applications and a Macro," accessed from: http://web.archive.org/web/20040728083413/http://www.ats.ucla.edu/stat/sa- s/library/nesug98/p046.pdf, (2004).

Guerard John B. Jr., Automatic Time Series Modeling, Intervention Analysis, and Effective Forecasting. (1989) Journal of Statistical Computation and Simulation, 1563-5163, vol. 34, Issue 1, pp. 43-49.

Guralnik, V. and Srivastava, J., Event Detection from Time Series Data (1999), Proceedings of the 5th ACM SIGKDD International Conference on Knowledge Discovery and Data Mining, pp. 33-42.

Harrison, H.C. et al., "An Intelligent Business Forecasting System", ACM Annual Computer Science Conference, pp. 229-236 (1993).

Harvey, Andrew, "Forecasting with Unobserved Components Time Series Models," Faculty of Economics, University of Cambridge, Prepared for Handbook of Economic Forecasting, pp. 1-89 (Jul. 2004).

Jacobsen, Erik et al., "Assigning Confidence to Conditional Branch Predictions", IEEE, Proceedings of the 29th Annual International Symposium on Microarchitecture, 12 pp. (Dec. 2-4, 1996).

Keogh, Eamonn J. et al., "Derivative Dynamic Time Warping", In First SIAM International Conference on Data Mining (SDM'2001), Chicago, USA, pp. 1-11 (2001).

Kobbacy, Khairy A.H., et al., Abstract, "Towards the development of an intelligent inventory management system," Integrated Manufacturing Systems, vol. 10, Issue 6, (1999) 11 pp.

Kumar, Mahesh, "Combining Forecasts Using Clustering", Rutcor Research Report 40-2005, cover page and pp. 1-16 (Dec. 2005).

Leonard, Michael et al., "Mining Transactional and Time Series Data", abstract and presentation, International Symposium of Forecasting, 23 pp. (2003).

Leonard, Michael et al., "Mining Transactional and Time Series Data", abstract, presentation and paper, SUGI, 142 pp. (Apr. 10-13, 2005).

Leonard, Michael, "Large-Scale Automatic Forecasting Using Inputs and Calendar Events", abstract and presentation, International Symposium on Forecasting Conference, 56 pp. (Jul. 4-7, 2004).

Leonard, Michael, "Large-Scale Automatic Forecasting Using Inputs and Calendar Events", White Paper, pp. 1-27 (2005).

Leonard, Michael, "Large-Scale Automatic Forecasting: Millions of Forecasts", abstract and presentation, International Symposium of Forecasting, 156 pp. (2002).

Leonard, Michael, "Predictive Modeling Markup Language for Time Series Models", abstract and presentation, International Symposium on Forecasting Conference, 35 pp. (Jul. 4-7, 2004).

Leonard, Michael, "Promotional Analysis and Forecasting for Demand Planning: A Practical Time Series Approach", with exhibits 1 and 2, SAS Institute Inc., Cary, North Carolina, 50 pp. (2000).

Lu, Sheng et al., "A New Algorithm for Linear and Nonlinear ARMA Model Parameter Estimation Using Affine Geometry", IEEE Transactions on Biomedical Engineering, vol. 48, No. 10, pp. 1116-1124 (Oct. 2001).

Malhotra, Manoj K. et al., "Decision making using multiple models", European Journal of Operational Research, 114, pp. 1-14 (1999).

(56) References Cited

OTHER PUBLICATIONS

McQuarrie, Allan D.R. et al., "Regression and Time Series Model Selection", World Scientific Publishing Co. Pte. Ltd., 40 pp. (1998).
Oates, Tim et al., "Clustering Time Series with Hidden Markov Models and Dynamic Time Warping", Computer Science Department, LGRC University of Massachusetts, In Proceedings of the IJCAI-99, 5 pp. (1999).
Park, Kwan Hee, Abstract "Development and evaluation of a prototype expert system for forecasting models", Mississippi State University, 1990, 1 pg.
Product Brochure, Forecast PRO, 2000, 12 pp.
Quest Software, "Funnel Web Analyzer: Analyzing the Way Visitors Interact with Your Web Site", http://www.quest.com/funnel.sub.--web/analyzer (2 pp.), Mar. 2002.
Safavi, Alex "Choosing the right forecasting software and system." The Journal of Business Forecasting Methods & Systems 19.3 (2000): 6-10. ABI/INFORM Global, ProQuest.
SAS Institute Inc., SAS/ETS User's Guide, Version 8, Cary NC; SAS Institute Inc., (1999) 1543 pages.
Seasonal Dummy Variables, Mar. 2004, http://shazam.econ.ubc.ca/intro/dumseas.htm, Accessed from: http://web.archive.org/web/20040321055948/http://shazam.econ.ubc.ca/intro- /dumseas.htm.
Simoncelli, Eero, "Least Squares Optimization," Center for Neural Science, and Courant Institute of Mathematical Sciences, pp. 1-8 (Mar. 9, 2005).
Tashman, Leonard J. et al., Abstract "Automatic Forecasting Software: A Survey and Evaluation", International Journal of Forecasting, vol. 7, Issue 2, Aug. 1991, 1 pg.
Using Predictor Variables, (1999) SAS OnlineDoc: Version 8, pp. 1325-1349, Accessed from: http://www.okstate.edu/sas/v8/saspdf/ets/chap27.pdf.
van Wijk, Jarke J. et al., "Cluster and Calendar based Visualization of Time Series Data", IEEE Symposium on Information Visualization (INFOVIS '99), San Francisco, pp. 1-6 (Oct. 25-26, 1999).
Vanderplaats, Garret N., "Numerical Optimization Techniques for Engineering Design", Vanderplaats Research & Development (publisher), Third Edition, 18 pp. (1999).
Wang, Liang et al., "An Expert System for Forecasting Model Selection", IEEE, pp. 704-709 (1992).
Babu, G., "Clustering in non-stationary environments using a clan-based evolutionary approach," Biological Cybernetics, Sep. 7, 1995, Springer Berlin I Heidelberg, pp. 367-374, vol. 73, Issue: 4.
Bruno, Giancarlo et al., "The Choice of Time Intervals in Seasonal Adjustment: A Heuristic Approach," Institute for Studies and Economic Analysis, Rome Italy, 14 pp. (2004).
Bruno, Giancarlo et al., "The Choice of Time Intervals in Seasonal Adjustment: Characterization and Tools," Institute for Studies and Economic Analysis, Rome, Italy, 21 pp. (Jul. 2001).
Bradley, D.C. et al., "Quantitation of measurement error with Optimal Segments: basis for adaptive time course smoothing," Am J Physiol Endocrinol Metab Jun. 1, 1993 264:(6) E902-E911.
Huang, N. E. et al.,"Applications of Hilbert-Huang transform to non-stationary financial time series analysis." Appl. Stochastic Models Bus. Ind., 19: 245-268 (2003).
Kalpakis, K. et al., "Distance measures for effective clustering of ARIMA time-series,"Data Mining, 2001. ICDM 2001, Proceedings IEEE International Conference on, vol., no., pp. 273-280, 2001.
Keogh, E. et al., "An online algorithm for segmenting time series," Data Mining, 2001. ICDM 2001, Proceedings IEEE International Conference on , vol., no., pp. 289-296, 2001.
Keogh, Eamonn et al., "Segmenting Time Series: A Survey and Novel Approach," Department of Information and Computer Science, University of California, Irvine, California 92697, 15 pp. (2004).
Palpanas, T. et al., "Online amnesic approximation of streaming time series," Data Engineering, 2004. Proceedings. 20th International Conference on , vol., no., pp. 339-349, Mar. 30-Apr. 2, 2004.
Wang Xiao-Ye; Wang Zheng-Ou; "A structure-adaptive piece-wise linear segments representation for time series," Information Reuse and Integration, 2004. IR I 2004. Proceedings of the 2004 IEEE International Conference on , vol., no., pp. 433-437, Nov. 8-10, 2004.
Yu, Lean et al., "Time Series Forecasting with Multiple Candidate Models: Selecting or Combining?" Journal of System Science and Complexity, vol. 18, No. 1, pp. 1-18 (Jan. 2005).
Atuk, Oguz et al., "Seasonal Adjustment in Economic Time Series," Statistics Department, Discussion Paper No. 2002/1, Central Bank of the Republic of Turkey, Central Bank Review, 56 pp. (2002).
IBM, "IBM Systems, IBM PowerExecutive Installation and User's Guide," Version 2.10, 62 pp. (Aug. 2007).
Non-Final Office Action dated Aug. 29, 2012 for U.S. Appl. No. 13/031,828, 17 pages.
Non-Final Office Action dated Oct. 31, 2007 for U.S. Appl. No. 10/402,849, 13 pages.
Final Office Action dated May 21, 2008 for U.S. Appl. No. 10/402,849, 19 pages.
Non-Final Office Action dated Feb. 20, 2009 for U.S. Appl. No. 10/402,849, 21 pages.
Final Office Action dated Jul. 1, 2010 for U.S. Appl. No. 10/402,849, 24 pages.
Non-Final Office Action dated Aug. 30, 2013 for U.S. Appl. No. 10/402,849, 26 pages.
Notice of Allowance dated Sep. 16, 2013 for U.S. Appl. No. 13/031,828 23 pages.
Non-Final Office Action dated Oct. 25, 2013 for U.S. Appl. No. 13/189,131, 26 pages.
Non-Final Office Action dated Jan. 16, 2014 for U.S. Appl. No. 13/440,045, 12 pages.
Non-Final Office Action dated Mar. 26, 2014 for U.S. Appl. No. 13/548,282, 29 pages.
Final Office Action dated Apr. 24, 2014 for U.S. Appl. No. 13/189,131, 29 pages.
Non-Final Office Action dated Aug. 8, 2014 for U.S. Appl. No. 10/402,849, 29 pages.
Notice of Allowance dated Aug. 29, 2014 for U.S. Appl. No. 13/440,045, 9 pages.
Final Office Action dated Oct. 24, 2014 for U.S. Appl. No. 13/548,282, 30 pages.
Notice of Allowance dated Jan. 14, 2015 for U.S. Appl. No. 13/551,647 8 pages.
Notice of Allowance dated Mar. 13, 2015 for U.S. Appl. No. 13/548,307, 9 pages.
Notice of Allowance dated May 8, 2015 for U.S. Appl. No. 13/786,838, 6 pages.
Non-Final Office Action dated May 22, 2015 for U.S. Appl. No. 10/402,849, 32 pages.
Non-Final Office Action dated Aug. 17, 2015 for U.S. Appl. No. 13/189,131, 11 pages.
Notice of Allowance dated Sep. 29, 2015 for U.S. Appl. No. 13/548,282, 10 pages.
Final Office Action dated Nov. 17, 2015 for U.S. Appl. No. 10/402,849, 31 pages.
Non-Final Office Action dated Mar. 1, 2016 for U.S. Appl. No. 13/189,131, 6 pages.
First Action Interview Pilot Program Pre-Interview Communication dated Aug. 18, 2017, for U.S. Appl. No. 14/736,131, 5 pages.
Notice of Allowance dated Nov. 22, 2017 for U.S. Appl. No. 14/736,131, 11 pages.
Non-Final Office Action dated Nov. 14, 2016 for U.S. Appl. No. 15/146,697, 16 pages.
Final Office Action dated May 15, 2017 for U.S. Appl. No. 15/146,697, 18 pages.
Non-Final Office Action dated Dec. 7, 2017 for U.S. Appl. No. 15/146,697, 23 pages.
Notice of Allowance dated May 14, 2018 for U.S. Appl. No. 15/890,013, 10 pages.
Notice of Allowance dated May 15, 2018 for U.S. Appl. No. 15/890,019, 10 pages.

* cited by examiner

FIG. 15

| | Transa... | Filter | Time Period | Status | Number of Series | Forecast | Override |
|---|---|---|---|---|---|---|---|
| ☐ | | BrandSham | 19Apr2015 | Conflict 1 | 1,245 | 23,394,818.16 | 27,922,367.89 |
| ☐ | | BrandSham | 29Apr2015 | Pending | 1,925 | 12,479.92 | 10,000.00 |
| ☐ | Group 6 | BrandSham | 22Apr2015 | Pending | 2,120 | 12,890.33 | 13,497.08 |
| ☐ | Group 5 | RegionsBo... | 29Feb2015 | Applied | 841 | 26,592,731.33 | 27,922,367.89 |
| ☐ | Group 5 | AllOuterwear | 22Feb2015 | Applied | 1,925 | 298,027.14 | 301,938.92 |
| ☐ | Group 4 | AllOuterwear | 29Jan2015 | Applied | 2,120 | 302,429.14 | - |
| ☐ | Group 4 | AlaskanOu... | 15Jan2015 | Applied | 452 | 18,161.36 | - |
| ☐ | Group 4 | Shoes1Filter | 19Apr2015 | Applied | 1,245 | 23,394,818.16 | 27,922,367.89 |
| ☐ | Group 4 | BrandSham | 29Apr2015 | Applied | 1,925 | 12,479.92 | 10,000.00 |
| ☐ | Group 3 | BrandSham | 22Apr2015 | Applied | 2,120 | 12,890.33 | 13,497.08 |
| ☐ | Group 3 | RegionsBo... | 29Feb2015 | Applied | 841 | 26,592,731.33 | 27,922,367.89 |
| ☐ | Group 3 | AllOuterwear | 22Feb2015 | Applied | 1,925 | 298,027.14 | 301,938.92 |
| ☐ | Group 3 | AllOuterwear | 29Jan2015 | Applied | 2,120 | 302,429.14 | - |
| ☐ | Group 2 | AlaskanOu... | 15Jan2015 | Applied | 452 | 18,161.36 | - |
| ☐ | Group 2 | Shoes1Filter | 19Apr2015 | Applied | 1,245 | 23,394,818.16 | 27,922,367.89 |
| ☐ | Group 1 | BrandSham | 29Apr2015 | Applied | 1,925 | 12,479.92 | 10,000.00 |
| ☐ | Group 1 | BrandSham | 22Apr2015 | Applied | 2,120 | 12,890.33 | 13,497.08 |

Impact analysis
Automatically resolve all conflicts — Statististical...
View overrides logs — Aggregated...

INTERACTIVE GRAPHICAL USER-INTERFACE FOR ANALYZING AND MANIPULATING TIME-SERIES PROJECTIONS

REFERENCE TO RELATED APPLICATIONS

This claims the benefit of priority under 35 U.S.C. § 119(e) to U.S. Provisional Patent Application No. 62/559,149, filed Sep. 15, 2017, and the benefit of priority under 35 U.S.C. § 119(b) to Indian Provisional Patent Application No. 201711016630, filed May 11, 2017, the entirety of each of which are hereby incorporated by reference herein.

This also claims the benefit of priority under 35 U.S.C. § 120 as a continuation-in-part of co-pending U.S. patent application Ser. No. 15/146,697, filed on May 4, 2016, which claims the benefit of priority under 35 U.S.C. § 119(e) to U.S. Provisional Patent Application No. 62/210,763, filed Aug. 27, 2015, the entirety of each of which is hereby incorporated by reference herein.

TECHNICAL FIELD

The present disclosure relates generally to an operator interface (e.g., graphical user interface). More specifically, but not by way of limitation, this disclosure relates to an interactive graphical user-interface for analyzing and manipulating time-series projections.

BACKGROUND

Graphical user interfaces (GUIs) can provide an effective way to access and explore data. They can include graphs, tables, charts, and other GUI components through which a user can identify patterns and trends in data. Some GUIs are interactive and responsive to various user inputs.

SUMMARY

One example of the present disclosure can include a non-transitory computer-readable medium comprising program code that is executable by a processing device for causing the processing device to perform one or more operations. The operations can include generating a display communication configured to cause a display device to display a graphical user-interface (GUI). The GUI can include a graph depicting an aggregated time-series projection over a future period of time. The aggregated time-series projection can be generated at least in part by aggregating a plurality of time series. The GUI can include an input element for receiving user input associated with a data point in the aggregated time-series projection. The GUI can include a graphical user-interface object for presenting an impact analysis portion of the GUI. The operations can include receiving the user input in the input element via a user interface device. The user input can indicate that an existing value for the data point in the aggregated time-series projection is to be overridden with an override value that is different from the existing value of the data point. The operations can include performing one or more steps based on receiving the user input in the input element. The steps can include adjusting the aggregated time-series projection using the override value for the data point to generate an updated version of the aggregated time-series projection. The steps can include rendering an updated version of the graph in the graphical user-interface that visually depicts the updated version of the aggregated time-series projection. The steps can include updating at least one data point in the plurality of time series by propagating an impact of overriding the existing value of the data point with the override value through the plurality of time series based on a relationship between the aggregated time-series projection and the plurality of time series. In some examples, the operations can include, based on detecting a user interaction with the graphical user-interface object, visually presenting the impact analysis portion of the graphical user-interface. The impact analysis portion can visually represent the impact of overriding the existing value of the data point with the override value on the plurality of time series.

Another example of the present disclosure can include a processing device and a memory device comprising program code that is executable by the processing device for causing the processing device to perform one or more operations. The operations can include generating a display communication configured to cause a display device to display a graphical user-interface (GUI). The GUI can include a graph depicting an aggregated time-series projection over a future period of time. The aggregated time-series projection can be generated at least in part by aggregating a plurality of time series. The GUI can include an input element for receiving user input associated with a data point in the aggregated time-series projection. The GUI can include a graphical user-interface object for presenting an impact analysis portion of the GUI. The operations can include receiving the user input in the input element via a user interface device. The user input can indicate that an existing value for the data point in the aggregated time-series projection is to be overridden with an override value that is different from the existing value of the data point. The operations can include performing one or more steps based on receiving the user input in the input element. The steps can include adjusting the aggregated time-series projection using the override value for the data point to generate an updated version of the aggregated time-series projection. The steps can include rendering an updated version of the graph in the graphical user-interface that visually depicts the updated version of the aggregated time-series projection. The steps can include updating at least one data point in the plurality of time series by propagating an impact of overriding the existing value of the data point with the override value through the plurality of time series based on a relationship between the aggregated time-series projection and the plurality of time series. In some examples, the operations can include, based on detecting a user interaction with the graphical user-interface object, visually presenting the impact analysis portion of the graphical user-interface. The impact analysis portion can visually represent the impact of overriding the existing value of the data point with the override value on the plurality of time series.

Another example of the present disclosure can include method including generating a display communication configured to cause a display device to display a graphical user-interface (GUI). The GUI can include a graph depicting an aggregated time-series projection over a future period of time. The aggregated time-series projection can be generated at least in part by aggregating a plurality of time series. The GUI can include an input element for receiving user input associated with a data point in the aggregated time-series projection. The GUI can include a graphical user-interface object for presenting an impact analysis portion of the GUI. The method can include receiving the user input in the input element via a user interface device. The user input can indicate that an existing value for the data point in the aggregated time-series projection is to be overridden with an override value that is different from the existing value of the data point. The method can include performing one or more steps based on receiving the user input in the input element. The steps can include adjusting the aggregated time-series projection using the override value for the data point to generate an updated version of the aggregated time-series projection. The steps can include rendering an updated version of the graph in the graphical user-interface that visually depicts the updated version of the aggregated time-series projection. The steps can include updating at least one data point in the plurality of time series by propagating an impact of overriding the existing value of the data point with the override value through the plurality of time series based on a relationship between the aggregated time-series projection and the plurality of time series. In some examples, the method can include, based on detecting a user interaction with the graphical user-interface object, visually presenting the impact analysis portion of the graphical user-interface. The impact analysis portion can visually represent the impact of overriding the existing value of the data point with the override value on the plurality of time series.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

The present disclosure is described in conjunction with the appended figures:

FIG. 15 is an example of a portion of an Overrides Management page in an interactive graphical user-interface according to some aspects.

FIG. 19 a flow chart of an example of a process for implementing an interactive graphical user-interface according to some aspects.

DETAILED DESCRIPTION

Figure 1:
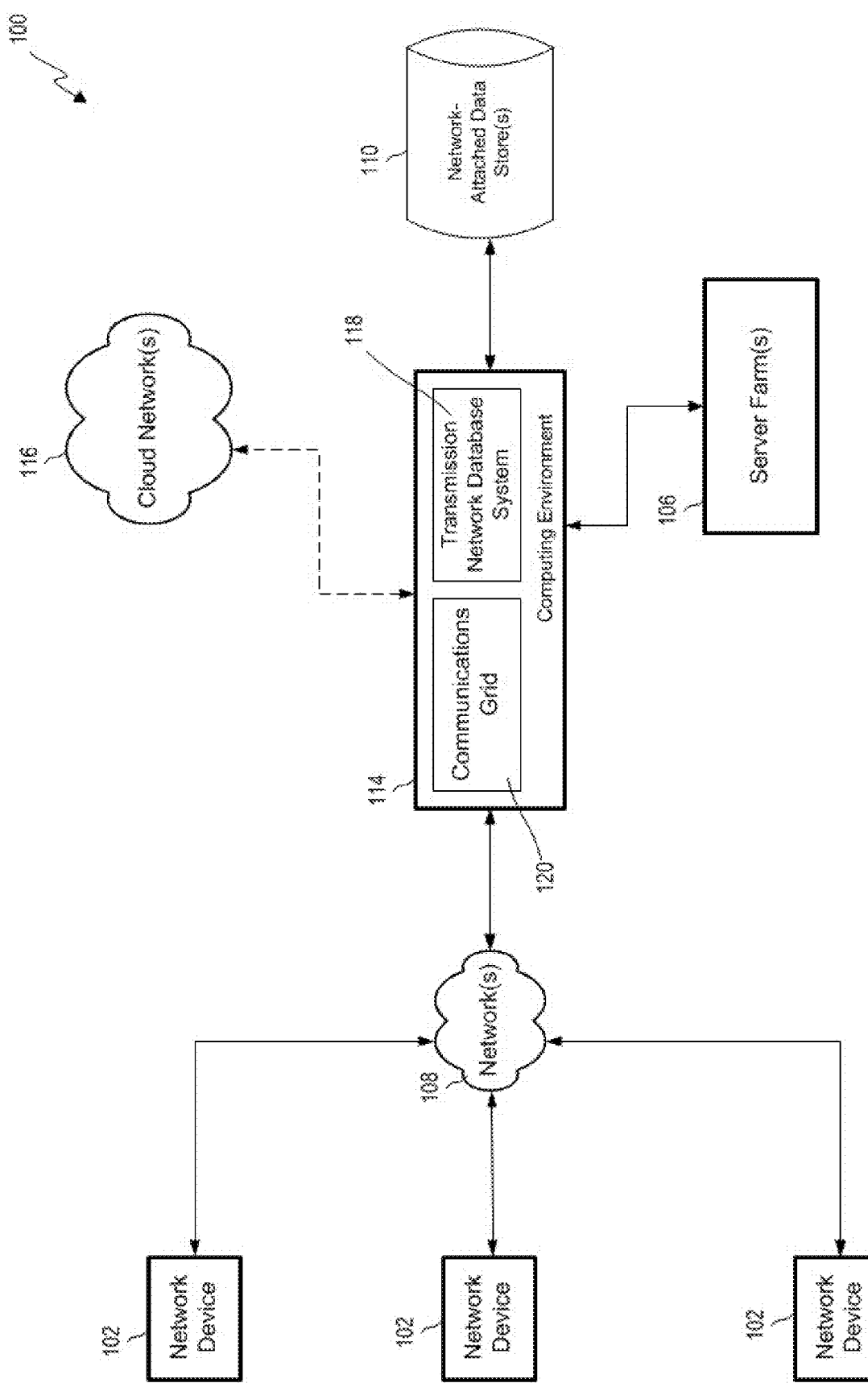
FIG. 1 is a block diagram of an example of the hardware components of a computing system according to some aspects.

Many organizations wish to analyze time-series projections at various levels of aggregation in order to derive important insights about the projections. For example, a cybersecurity organization may have time-series projections forecasting intrusion (hacking) attempts on various computer systems over a future time-period. And the cybersecurity organization may wish to dynamically aggregate the time-series projections together according to one or more criteria (e.g., by region, computer system, type of intrusion attempt, or any combination of these) to identify patterns or trends. But typical graphical user interface (GUI) systems cannot perform this type of dynamic aggregation on time-series projections. This is because aggregating time-series projections is especially difficult, since time-series projections are not simple numbers. Instead, time-series projections are distributions of values that can have prediction standard errors and confidence limits. And to properly aggregate time-series projections, these distribution properties must be preserved or otherwise taken into account. This aggregation problem becomes even more difficult when the time-series projections do not have any fixed hierarchical relationship to one another (e.g., the data has a non-hierarchical relationship). As a result, typical GUI systems fail to provide this functionality.

Because typical GUI systems lack the abovementioned functionality, they also lack other corresponding functionality, such as the ability to manually adjust (e.g., override) a value in a resulting aggregate time-series projection. But such functionality can be particularly useful for enabling a user to correct or reduce errors in the aggregate time-series projection. Additionally, manually overriding a value in the aggregate time-series projection can have various impacts on the underlying time-series projections that were combined to form the aggregate time-series projection. It can be important for organizations to be able to view and understand these impacts but, as noted above, traditional GUI systems lack the ability to provide these details.

Some examples of the present disclosure can overcome one or more of the abovementioned problems by providing a GUI system that can (i) automatically and accurately generate an aggregate time-series projection from a group of underlying time-series projections; (ii) provide a visual representation of the aggregate time-series projection for analysis to a user; (iii) enable one or more users to manually override values in the aggregate time-series projection; (iv) automatically propagate the impact of the override through the underlying time-series projections; (v) present a visual representation of the impact of the override on the underlying time-series projections; (vi) automatically detect conflicts when multiple users attempt to apply incompatible overrides; (vii) automatically resolve the conflicts or provide options through which a user can manually resolve the conflicts; or (viii) any combination of these. Thus, some GUI systems of the present disclosure can be more accurate, usable, functional, and intuitive than prior GUI systems, thereby enabling users to more efficiently and accurately assess time-series projections at various levels of aggregation than prior GUI systems.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIGS. 1-10 depict examples of systems and methods usable for an interactive graphical user-interface for analyzing and manipulating time-series projections according to some aspects. For example, FIG. 1 is a block diagram of an example of the hardware components of a computing system according to some aspects. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. The computing environment 114 may include one or more other systems. For example, computing environment 114 may include a database system 118 or a communications grid 120. The computing environment 114 can include one or more processing devices (e.g., distributed over one or more networks or otherwise in communication with one another) that, in some examples, can collectively be referred to as a processor or a processing device.

Some examples can involve machine-learning specific processors (e.g., not generic CPUs) that are specifically configured to execute and process machine-learning models more efficiently and speedily. Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine-learning approach or one or more neural networks using semiconductor (e.g., silicon (Si), gallium arsenide (GaAs)) devices. These processors may also be employed in heterogeneous computing architectures with a number of and a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Data transmission network 100 also includes one or more network devices 102. Network devices 102 may include client devices that can communicate with computing environment 114. For example, network devices 102 may send data to the computing environment 114 to be processed, may send communications to the computing environment 114 to control different aspects of the computing environment or the data it is processing, among other reasons. Network devices 102 may interact with the computing environment 114 through a number of ways, such as, for example, over one or more networks 108.

In some examples, network devices 102 may provide a large amount of data, either all at once or streaming over a period of time (e.g., using event stream processing (ESP)), to the computing environment 114 via networks 108. For example, the network devices 102 can transmit electronic messages for implementing an interactive graphical user-interface for analyzing and manipulating time-series projections, all at once or streaming over a period of time, to the computing environment 114 via networks 108.

The network devices 102 may include network computers, sensors, databases, or other devices that may transmit or otherwise provide data to computing environment 114. For example, network devices 102 may include local area network devices, such as routers, hubs, switches, or other computer networking devices. These devices may provide a variety of stored or generated data, such as network data or data specific to the network devices 102 themselves. Network devices 102 may also include sensors that monitor their environment or other devices to collect data regarding that environment or those devices, and such network devices 102 may provide data they collect over time. Network devices 102 may also include devices within the internet of things, such as devices within a home automation network. Some of these devices may be referred to as edge devices, and may involve edge-computing circuitry. Data may be transmitted by network devices 102 directly to computing environment 114 or to network-attached data stores, such as network-attached data stores 110 for storage so that the data may be retrieved later by the computing environment 114 or other portions of data transmission network 100. For example, the network devices 102 can transmit data usable for implementing an interactive graphical user-interface for analyzing and manipulating time-series projections to a network-attached data store 110 for storage. The computing environment 114 may later retrieve the data from the network-attached data store 110 and use the data to implement the interactive graphical user-interface.

Network-attached data stores 110 can store data to be processed by the computing environment 114 as well as any intermediate or final data generated by the computing system in non-volatile memory. But in certain examples, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated dynamically (e.g., on the fly). In this situation, the computing environment 114 may be configured to retain the processed information within memory so that responses can be generated for the user at different levels of detail as well as allow a user to interactively query against this information.

Network-attached data stores 110 may store a variety of different types of data organized in a variety of different ways and from a variety of different sources. For example, network-attached data stores may include storage other than primary storage located within computing environment 114 that is directly accessible by processors located therein. Network-attached data stores may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves or transitory electronic communications. Examples of a non-transitory medium may include, for example, a magnetic disk or tape, optical storage media such as compact disk or digital versatile disk, flash memory, memory or memory devices. A computer-program product may include code or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data.

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time-stamped data may be aggregated by time (e.g., into daily time period units) to generate time series data or structured hierarchically according to one or more dimensions (e.g., parameters, attributes, or variables). For example, data may be stored in a hierarchical data structure, such as a relational online analytical processing (ROLAP) or multidimensional online analytical processing (MOLAP) database, or may be stored in another tabular form, such as in a flat-hierarchy form.

Data transmission network 100 may also include one or more server farms 106. Computing environment 114 may route select communications or data to the sever farms 106 or one or more servers within the server farms 106. Server farms 106 can be configured to provide information in a predetermined manner. For example, server farms 106 may access data to transmit in response to a communication. Server farms 106 may be separately housed from each other device within data transmission network 100, such as computing environment 114, or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more websites, sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain examples, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network 116 can dynamically scale to meet the needs of its users. The cloud network 116 may include one or more computers, servers, or systems. In some examples, the computers, servers, or systems that make up the cloud network 116 are different from the user's own on-premises computers, servers, or systems. For example, the cloud network 116 may host an application, and a user may, via a communication network such as the Internet, order and use the application on demand. In some examples, the cloud network 116 may host an application for implementing an interactive graphical user-interface for analyzing and manipulating time-series projections.

While each device, server, and system in FIG. 1 is shown as a single device, multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between server farms 106 and computing environment 114, or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired or wireless networks may be implemented using routers, access points, bridges, gateways, or the like, to connect devices in the network 108. The networks 108 can be incorporated entirely within or can include an intranet, an extranet, or a combination thereof. In one example, communications between two or more systems or devices can be achieved by a secure communications protocol, such as secure sockets layer (SSL) or transport layer security (TLS). In addition, data or transactional details may be encrypted.

Some aspects may utilize the Internet of Things (IoT), where things (e.g., machines, devices, phones, sensors) can be connected to networks and the data from these things can be collected and processed within the things or external to the things. For example, the IoT can include sensors in many different devices, and high value analytics can be applied to identify hidden relationships and drive increased efficiencies. This can apply to both big data analytics and real-time (e.g., ESP) analytics.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The computing nodes in the communications grid 120 and the transmission network database system 118 may share the same processor hardware, such as processors that are located within computing environment 114.

In some examples, the computing environment 114, a network device 102, or both can implement one or more processes for implementing an interactive graphical user-interface for analyzing and manipulating time-series projections. For example, the computing environment 114, a network device 102, or both can implement one or more versions of the processes discussed with respect to any of the figures.

Figure 2:
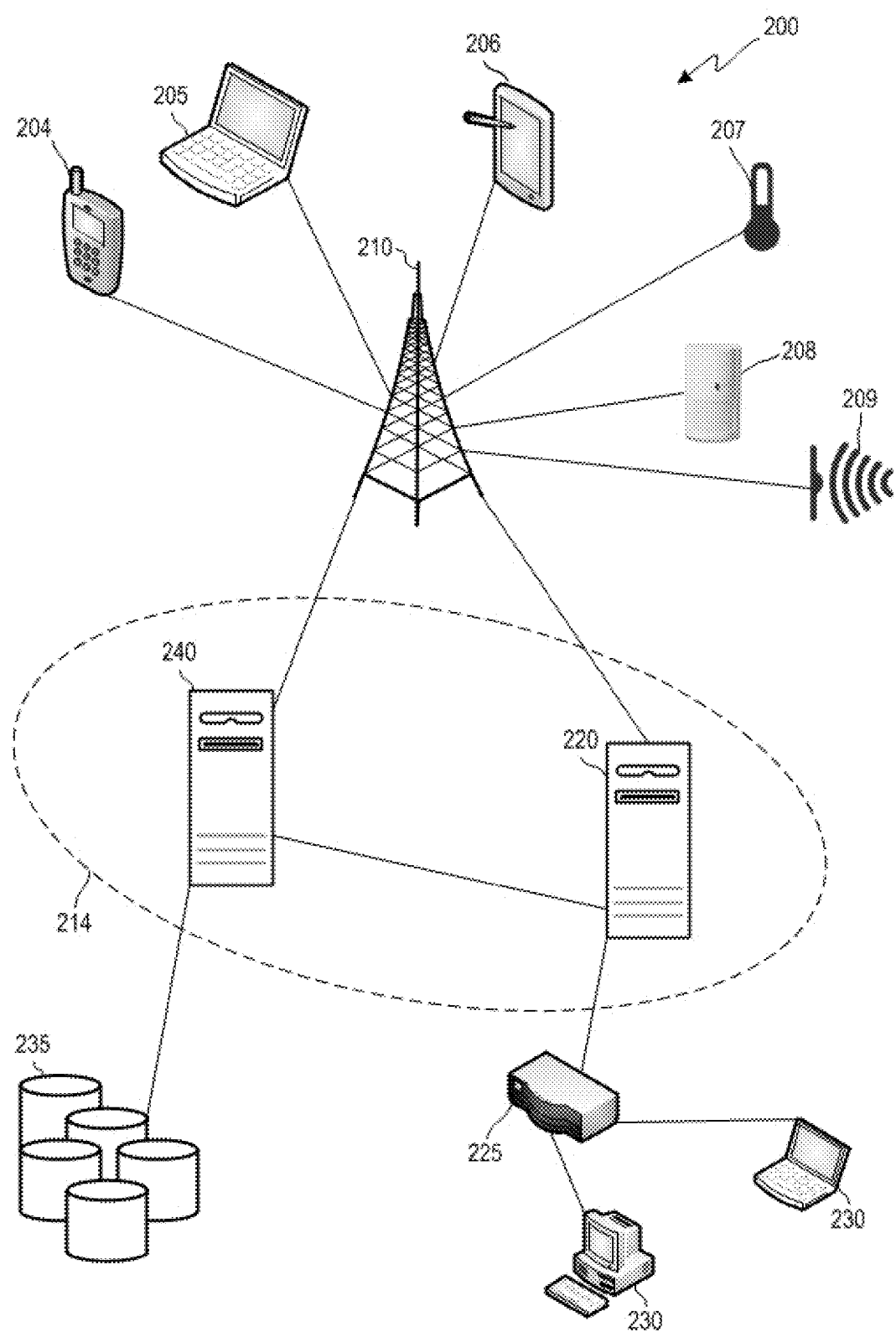
FIG. 2 is an example of devices that can communicate with each other over an exchange system and via a network according to some aspects.

FIG. 2 is an example of devices that can communicate with each other over an exchange system and via a network according to some aspects. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). In some examples, the communication can include times series data. The communication can be routed to another network device, such as network devices 205-209, via base station 210. The communication can also be routed to computing environment 214 via base station 210. In some examples, the network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems. The network devices may detect and record data related to the environment that it monitors, and transmit that data to computing environment 214.

The network devices 204-209 may also perform processing on data it collects before transmitting the data to the computing environment 214, or before deciding whether to transmit data to the computing environment 214. For example, network devices 204-209 may determine whether data collected meets certain rules, for example by comparing data or values calculated from the data and comparing that data to one or more thresholds. The network devices 204-209 may use this data or comparisons to determine if the data is to be transmitted to the computing environment 214 for further use or processing. In some examples, the network devices 204-209 can pre-process the data prior to transmitting the data to the computing environment 214. For example, the network devices 204-209 can reformat the data before transmitting the data to the computing environment 214 for further processing (e.g., analyzing the data to implement at least a portion of an interactive graphical user-interface).

Computing environment 214 may include machines 220, 240. Although computing environment 214 is shown in FIG. 2 as having two machines 220, 240, computing environment 214 may have only one machine or may have more than two machines. The machines 220, 240 that make up computing environment 214 may include specialized computers, servers, or other machines that are configured to individually or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with client devices 230 via one or more routers 225. Computing environment 214 may collect, analyze or store data from or pertaining to communications, client device operations, client rules, or user-associated actions stored at one or more data stores 235. Such data may influence communication routing to the devices within computing environment 214, how data is stored or processed within computing environment 214, among other actions.

Notably, various other devices can further be used to influence communication routing or processing between devices within computing environment 214 and with devices outside of computing environment 214. For example, as shown in FIG. 2, computing environment 214 may include a machine 240 that is a web server. Computing environment 214 can retrieve data of interest, such as client information (e.g., product information, client rules, etc.), technical product details, news, blog posts, e-mails, forum posts, electronic documents, social media posts (e.g., Twitter™ posts or Facebook™ posts), time series data, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices 204-209 may receive data periodically and in real time from a web server or other source. Devices within computing environment 214 may also perform pre-analysis on data it receives to determine if the data received should be processed as part of an ongoing project. For example, as part of a project in which an interactive graphical user-interface is generated from data, the computing environment 214 can perform a pre-analysis of the data. The pre-analysis can include determining whether the data is in a correct format for the interactive graphical user-interface and, if not, reformatting the data into the correct format.

Figure 3:
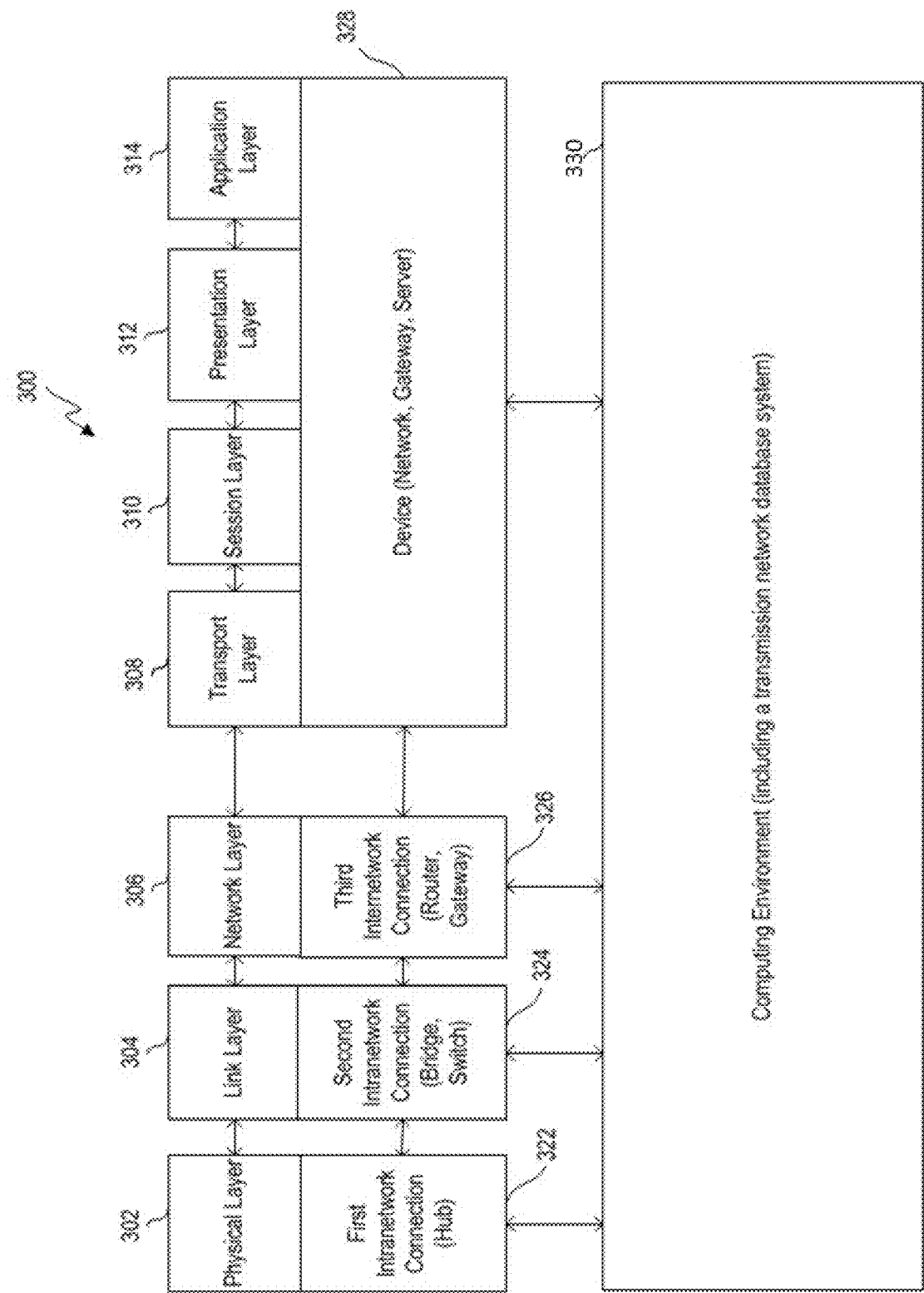
FIG. 3 is a block diagram of a model of an example of a communications protocol system according to some aspects.

FIG. 3 is a block diagram of a model of an example of a communications protocol system according to some aspects. More specifically, FIG. 3 identifies operation of a computing environment in an Open Systems Interaction model that corresponds to various connection components. The model 300 shows, for example, how a computing environment, such as computing environment (or computing environment 214 in FIG. 2) may communicate with other devices in its network, and control how communications between the computing environment and other devices are executed and under what conditions.

The model 300 can include layers 302-314. The layers 302-314 are arranged in a stack. Each layer in the stack serves the layer one level higher than it (except for the application layer, which is the highest layer), and is served by the layer one level below it (except for the physical layer 302, which is the lowest layer). The physical layer 302 is the lowest layer because it receives and transmits raw bites of data, and is the farthest layer from the user in a communications system. On the other hand, the application layer is the highest layer because it interacts directly with a software application.

As noted, the model 300 includes a physical layer 302. Physical layer 302 represents physical communication, and can define parameters of that physical communication. For example, such physical communication may come in the form of electrical, optical, or electromagnetic communications. Physical layer 302 also defines protocols that may control communications within a data transmission network.

Link layer 304 defines links and mechanisms used to transmit (e.g., move) data across a network. The link layer manages node-to-node communications, such as within a grid-computing environment. Link layer 304 can detect and correct errors (e.g., transmission errors in the physical layer 302). Link layer 304 can also include a media access control (MAC) layer and logical link control (LLC) layer.

Network layer 306 can define the protocol for routing within a network. In other words, the network layer coordinates transferring data across nodes in a same network (e.g., such as a grid-computing environment). Network layer 306 can also define the processes used to structure local addressing within the network.

Transport layer 308 can manage the transmission of data and the quality of the transmission or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt or format data based on data types known to be accepted by an application or network layer.

Application layer 314 interacts directly with software applications and end users, and manages communications between them. Application layer 314 can identify destinations, local resource states or availability or communication content or formatting using the applications.

For example, a communication link can be established between two devices on a network. One device can transmit an analog or digital representation of an electronic message that includes a data set to the other device. The other device can receive the analog or digital representation at the physical layer 302. The other device can transmit the data associated with the electronic message through the remaining layers 304-314. The application layer 314 can receive data associated with the electronic message. The application layer 314 can identify one or more applications, such as an application for implementing an interactive graphical user-interface for analyzing and manipulating time-series projections, to which to transmit data associated with the electronic message. The application layer 314 can transmit the data to the identified application.

Intra-network connection components 322, 324 can operate in lower levels, such as physical layer 302 and link layer 304, respectively. For example, a hub can operate in the physical layer, a switch can operate in the physical layer, and a router can operate in the network layer. Inter-network connection components 326, 328 are shown to operate on higher levels, such as layers 306-314. For example, routers can operate in the network layer and network devices can operate in the transport, session, presentation, and application layers.

A computing environment 330 can interact with or operate on, in various examples, one, more, all or any of the various layers. For example, computing environment 330 can interact with a hub (e.g., via the link layer) to adjust which devices the hub communicates with. The physical layer 302 may be served by the link layer 304, so it may implement such data from the link layer 304. For example, the computing environment 330 may control which devices from which it can receive data. For example, if the computing environment 330 knows that a certain network device has turned off, broken, or otherwise become unavailable or unreliable, the computing environment 330 may instruct the hub to prevent any data from being transmitted to the computing environment 330 from that network device. Such a process may be beneficial to avoid receiving data that is inaccurate or that has been influenced by an uncontrolled environment. As another example, computing environment 330 can communicate with a bridge, switch, router or gateway and influence which device within the system (e.g., system 200) the component selects as a destination. In some examples, computing environment 330 can interact with various layers by exchanging communications with equipment operating on a particular layer by routing or modifying existing communications. In another example, such as in a grid-computing environment, a node may determine how data within the environment should be routed (e.g., which node should receive certain data) based on certain parameters or information provided by other layers within the model.

The computing environment 330 may be a part of a communications grid environment, the communications of which may be implemented as shown in the protocol of FIG. 3. For example, referring back to FIG. 2, one or more of machines 220 and 240 may be part of a communications grid-computing environment. A gridded computing environment may be employed in a distributed system with non-interactive workloads where data resides in memory on the machines, or compute nodes. In such an environment, analytic code, instead of a database management system, can control the processing performed by the nodes. Data is co-located by pre-distributing it to the grid nodes, and the analytic code on each node loads the local data into memory. Each node may be assigned a particular task, such as a portion of a processing project, or to organize or control other nodes within the grid. For example, each node may be assigned a portion of a processing task for implementing an interactive graphical user-interface for analyzing and manipulating time-series projections.

Figure 4:
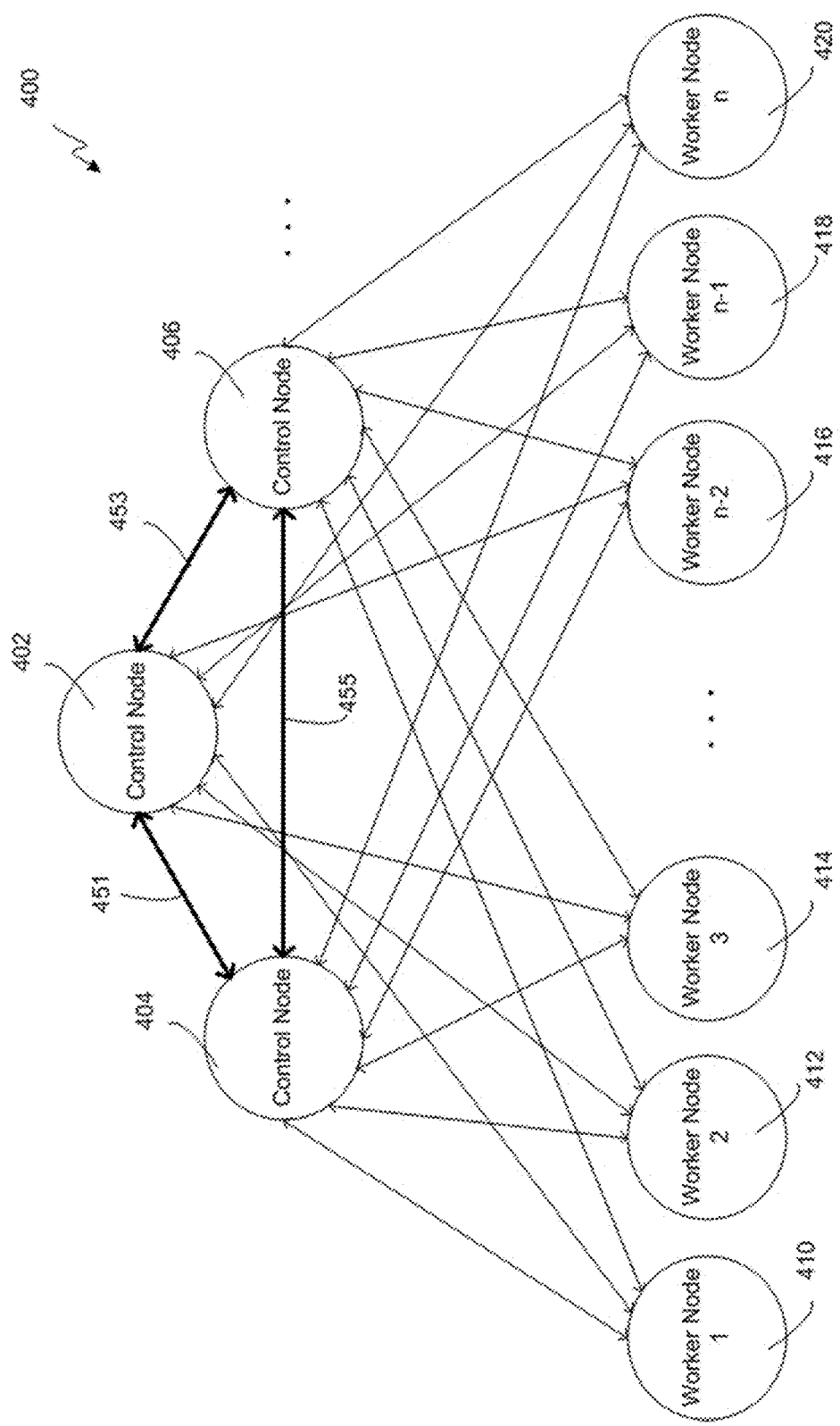
FIG. 4 is a hierarchical diagram of an example of a communications grid computing system including a variety of control and worker nodes according to some aspects.

FIG. 4 is a hierarchical diagram of an example of a communications grid computing system 400 including a variety of control and worker nodes according to some aspects. Communications grid computing system 400 includes three control nodes and one or more worker nodes. Communications grid computing system 400 includes control nodes 402, 404, and 406. The control nodes are communicatively connected via communication paths 451, 453, and 455. The control nodes 402-406 may transmit information (e.g., related to the communications grid or notifications) to and receive information from each other. Although communications grid computing system 400 is shown in FIG. 4 as including three control nodes, the communications grid may include more or less than three control nodes.

Communications grid computing system 400 (which can be referred to as a "communications grid") also includes one or more worker nodes. Shown in FIG. 4 are six worker nodes 410-420. Although FIG. 4 shows six worker nodes, a communications grid can include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid computing system 400 may be connected (wired or wirelessly, and directly or indirectly) to control nodes 402-406. Each worker node may receive information from the control nodes (e.g., an instruction to perform work on a project) and may transmit information to the control nodes (e.g., a result from work performed on a project). Furthermore, worker nodes may communicate with each other directly or indirectly. For example, worker nodes may transmit data between each other related to a job being performed or an individual task within a job being performed by that worker node. In some examples, worker nodes may not be connected (communicatively or otherwise) to certain other worker nodes. For example, a worker node 410 may only be able to communicate with a particular control node 402. The worker node 410 may be unable to communicate with other worker nodes 412-420 in the communications grid, even if the other worker nodes 412-420 are controlled by the same control node 402.

A control node 402-406 may connect with an external device with which the control node 402-406 may communicate (e.g., a communications grid user, such as a server or computer, may connect to a controller of the grid). For example, a server or computer may connect to control nodes 402-406 and may transmit a project or job to the node, such as a project or job related to implementing an interactive graphical user-interface for analyzing and manipulating time-series projections. The project may include the data set. The data set may be of any size and can include a time series. Once the control node 402-406 receives such a project including a large data set, the control node may distribute the data set or projects related to the data set to be performed by worker nodes. Alternatively, for a project including a large data set, the data set may be receive or stored by a machine other than a control node 402-406 (e.g., a Hadoop data node).

Control nodes 402-406 can maintain knowledge of the status of the nodes in the grid (e.g., grid status information), accept work requests from clients, subdivide the work across worker nodes, and coordinate the worker nodes, among other responsibilities. Worker nodes 412-420 may accept work requests from a control node 402-406 and provide the control node with results of the work performed by the worker node. A grid may be started from a single node (e.g., a machine, computer, server, etc.). This first node may be assigned or may start as the primary control node 402 that will control any additional nodes that enter the grid.

When a project is submitted for execution (e.g., by a client or a controller of the grid) it may be assigned to a set of nodes. After the nodes are assigned to a project, a data structure (e.g., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node 402 receives a project, the primary control node may distribute portions of the project to its worker nodes for execution. For example, a project for implementing an interactive graphical user-interface for analyzing and manipulating time-series projections can be initiated on communications grid computing system 400. A primary control node can control the work to be performed for the project in order to complete the project as requested or instructed. The primary control node may distribute work to the worker nodes 412-420 based on various factors, such as which subsets or portions of projects may be completed most efficiently and in the correct amount of time. For example, a worker node 412 may generate at least a portion of an interactive graphical-user interface using at least a portion of data that is already local (e.g., stored on) the worker node. The primary control node also coordinates and processes the results of the work performed by each worker node 412-420 after each worker node 412-420 executes and completes its job. For example, the primary control node may receive a result from one or more worker nodes 412-420, and the primary control node may organize (e.g., collect and assemble) the results received and compile them to produce a complete result for the project received from the end user.

Any remaining control nodes, such as control nodes 404, 406, may be assigned as backup control nodes for the project. In an example, backup control nodes may not control any portion of the project. Instead, backup control nodes may serve as a backup for the primary control node and take over as primary control node if the primary control node were to fail. If a communications grid were to include only a single control node 402, and the control node 402 were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes 402-406, including a backup control node, may be beneficial.

In some examples, the primary control node may open a pair of listening sockets to add another node or machine to the grid. A socket may be used to accept work requests from clients, and the second socket may be used to accept connections from other grid nodes. The primary control node may be provided with a list of other nodes (e.g., other machines, computers, servers, etc.) that can participate in the grid, and the role that each node can fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it can check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. But, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404, 406 (and, for example, to other control or worker nodes 412-420 within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes 410-420 in the communications grid, unique identifiers of the worker nodes 410-420, or their relationships with the primary control node 402) and the status of a project (including, for example, the status of each worker node's portion of the project). The snapshot may also include analysis or results received from worker nodes 410-420 in the communications grid. The backup control nodes 404, 406 may receive and store the backup data received from the primary control node 402. The backup control nodes 404, 406 may transmit a request for such a snapshot (or other information) from the primary control node 402, or the primary control node 402 may send such information periodically to the backup control nodes 404, 406.

As noted, the backup data may allow a backup control node 404, 406 to take over as primary control node if the primary control node 402 fails without requiring the communications grid to start the project over from scratch. If the primary control node 402 fails, the backup control node 404, 406 that will take over as primary control node may retrieve the most recent version of the snapshot received from the primary control node 402 and use the snapshot to continue the project from the stage of the project indicated by the backup data. This may prevent failure of the project as a whole.

A backup control node 404, 406 may use various methods to determine that the primary control node 402 has failed. In one example of such a method, the primary control node 402 may transmit (e.g., periodically) a communication to the backup control node 404, 406 that indicates that the primary control node 402 is working and has not failed, such as a heartbeat communication. The backup control node 404, 406 may determine that the primary control node 402 has failed if the backup control node has not received a heartbeat communication for a certain predetermined period of time. Alternatively, a backup control node 404, 406 may also receive a communication from the primary control node 402 itself (before it failed) or from a worker node 410-420 that the primary control node 402 has failed, for example because the primary control node 402 has failed to communicate with the worker node 410-420.

Different methods may be performed to determine which backup control node of a set of backup control nodes (e.g., backup control nodes 404, 406) can take over for failed primary control node 402 and become the new primary control node. For example, the new primary control node may be chosen based on a ranking or "hierarchy" of backup control nodes based on their unique identifiers. In an alternative example, a backup control node may be assigned to be the new primary control node by another device in the communications grid or from an external device (e.g., a system infrastructure or an end user, such as a server or computer, controlling the communications grid). In another alternative example, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative example, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed. In some examples, a communications grid computing system 400 can be used to implement an interactive graphical user-interface for analyzing and manipulating time-series projections.

Figure 5:
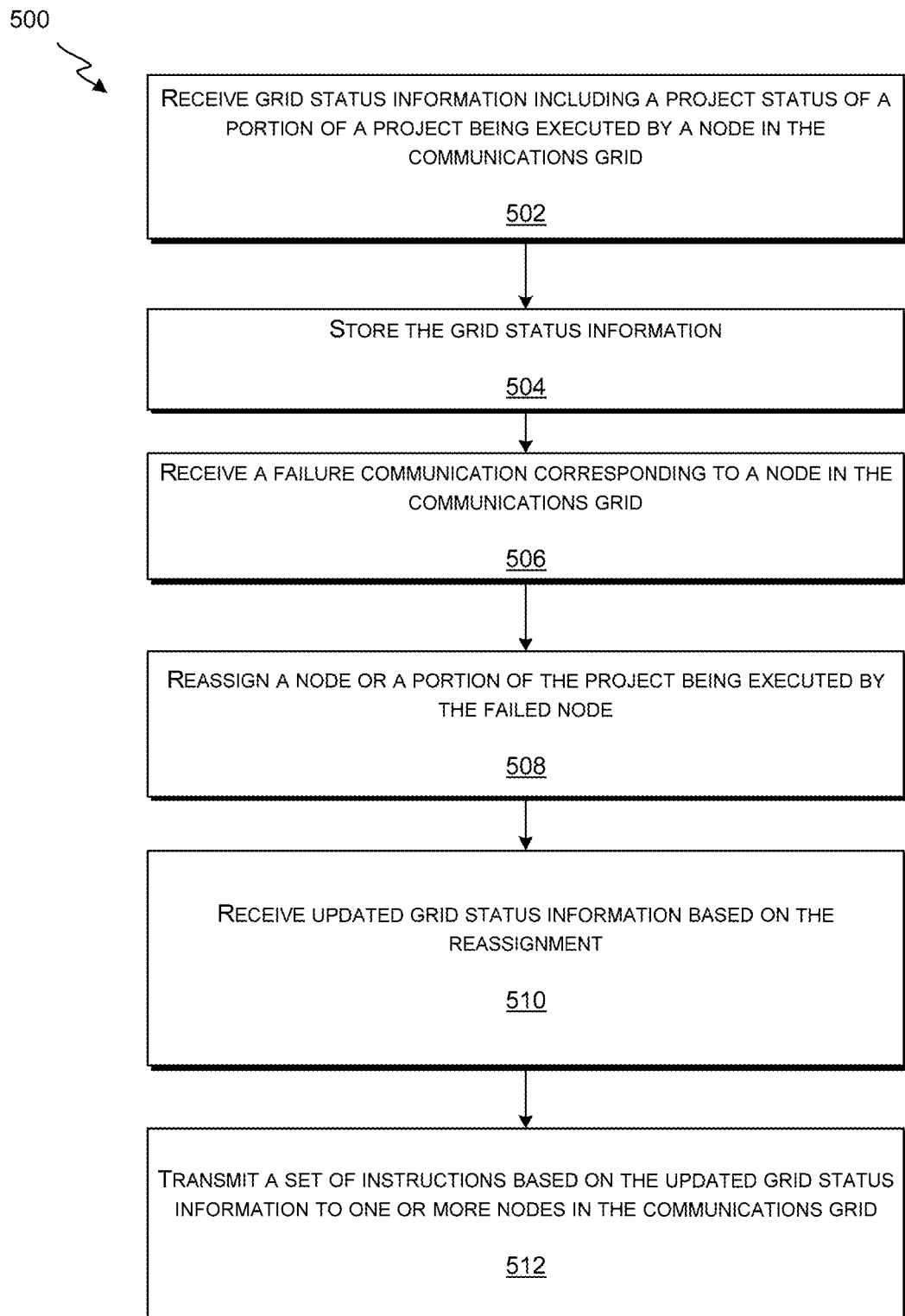
FIG. 5 is a flow chart of an example of a process for adjusting a communications grid or a work project in a communications grid after a failure of a node according to some aspects.

FIG. 5 is a flow chart of an example of a process for adjusting a communications grid or a work project in a communications grid after a failure of a node according to some aspects. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
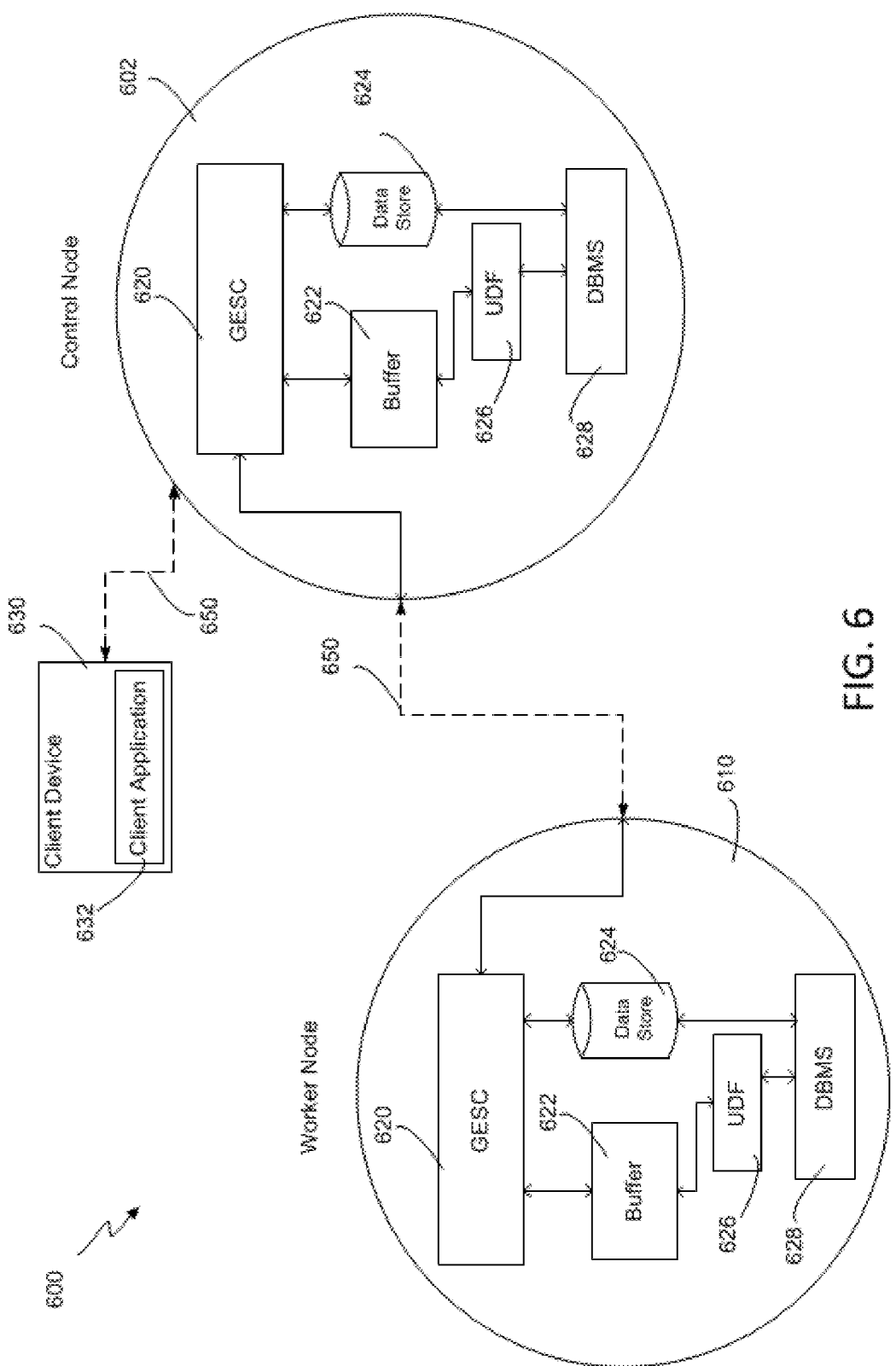
FIG. 6 is a block diagram of a portion of a communications grid computing system including a control node and a worker node according to some aspects.

FIG. 6 is a block diagram of a portion of a communications grid computing system 600 including a control node and a worker node according to some aspects. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via communication path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain examples, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 610 may be connected via a network, such as network 108 shown in FIG. 1. Therefore, nodes 602 and 610 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
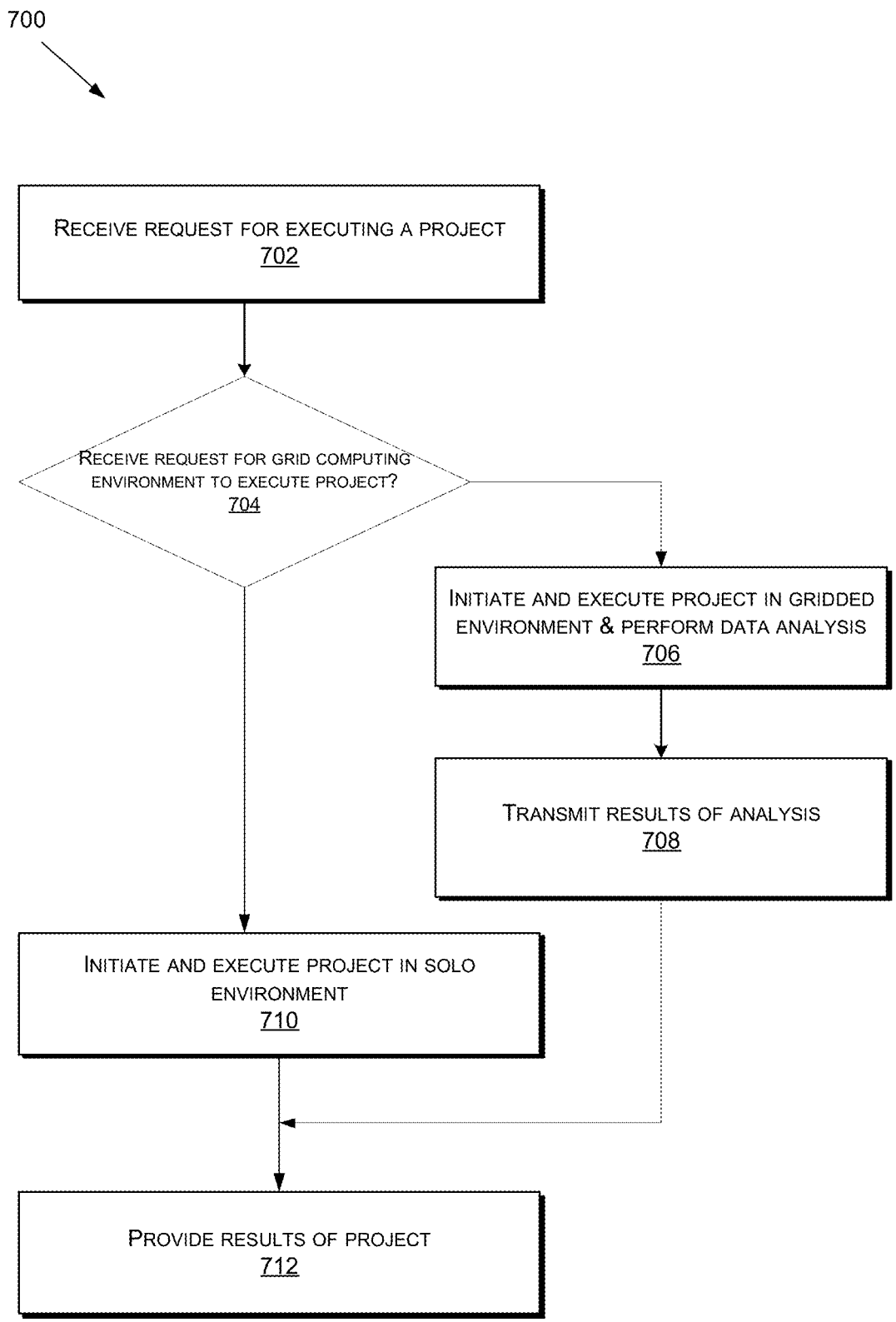
FIG. 7 is a flow chart of an example of a process for executing a data analysis or processing project according to some aspects.

FIG. 7 is a flow chart of an example of a process for executing a data analysis or a processing project according to some aspects. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

Figure 8:
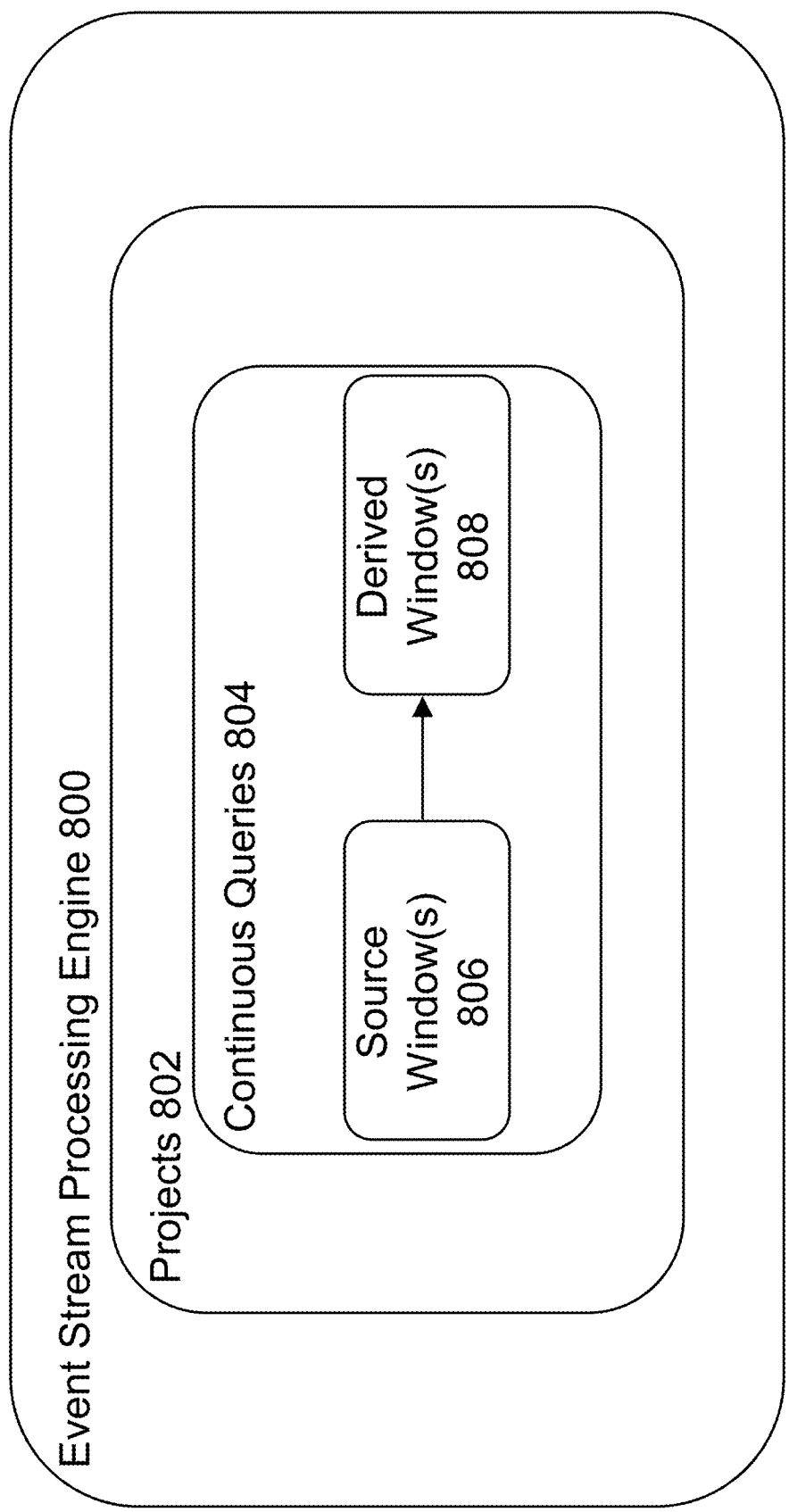
FIG. 8 is a block diagram including components of an Event Stream Processing Engine (ESPE) according to some aspects.

FIG. 8 is a block diagram including components of an Event Stream Processing Engine (ESPE) according to some aspects. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

Figure 9:
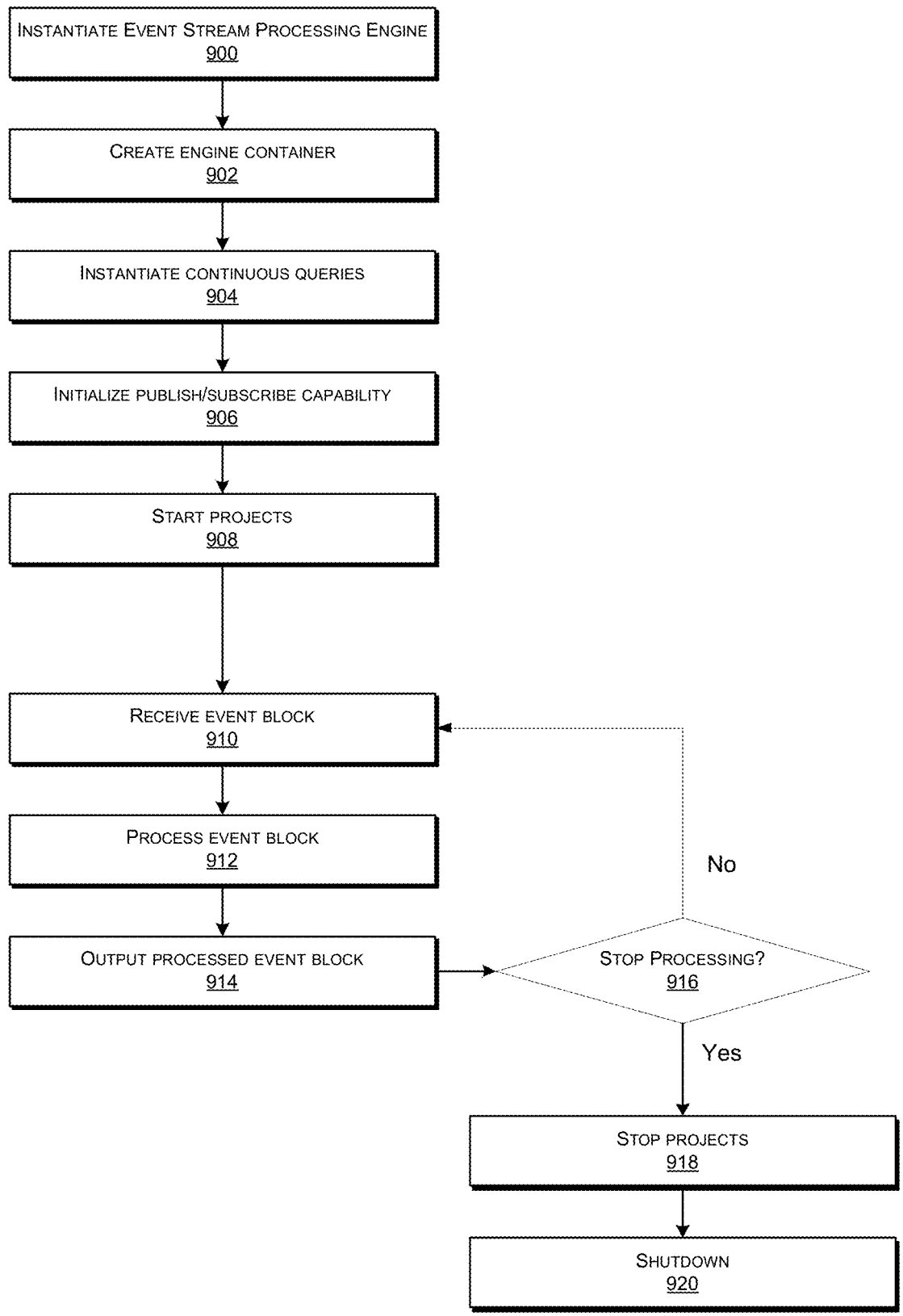
FIG. 9 is a flow chart of an example of a process including operations performed by an event stream processing engine according to some aspects.

FIG. 9 is a flow chart of an example of a process including operations performed by an event stream processing engine according to some aspects. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. Various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

Figure 10:
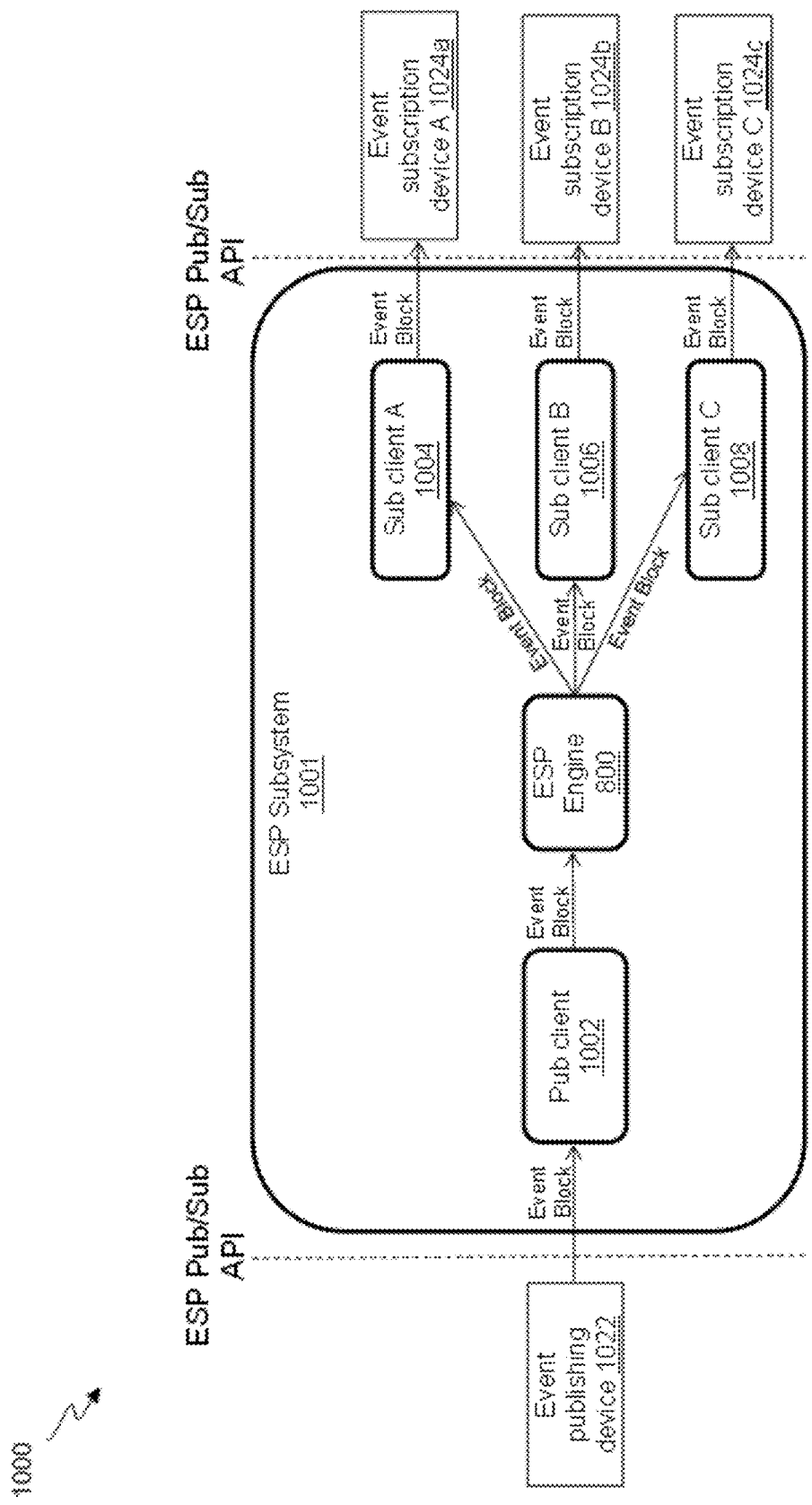
FIG. 10 is a block diagram of an ESP system interfacing between a publishing device and multiple event subscribing devices according to some aspects.

FIG. 10 is a block diagram of an ESP system 1000 interfacing between publishing device 1022 and event subscription devices 1024a-c according to some aspects. ESP system 1000 may include ESP subsystem 1001, publishing device 1022, an event subscription device A 1024a, an event subscription device B 1024b, and an event subscription device C 1024c. Input event streams are output to ESP subsystem 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscription device A 1024a, event subscription device B 1024b, and event subscription device C 1024c. ESP system 1000 may include a greater or a fewer number of event subscription devices of event subscription devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscription device A 1024a, event subscription device B 1024b, and event subscription device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscription device A 1024a, event subscription device B 1024b, and event subscription device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the publishing device 1022.

ESP subsystem 1001 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscription device A 1024a using the publish/subscribe API. Subscribing client B 1006 may be started by an event subscription application B executing at event subscription device B 1024b using the publish/subscribe API. Subscribing client C 1008 may be started by an event subscription application C executing at event subscription device C 1024c using the publish/subscribe API.

An event block object containing one or more event objects is injected into a source window of the one or more source windows 806 from an instance of an event publishing application on publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscription devices 1024a-c. For example, subscribing client A 1004, subscribing client B 1006, and subscribing client C 1008 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some examples, big data is processed for an analytics project after the data is received and stored. In other examples, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the present disclosure provide technical solutions to technical problems, such as computing problems that arise when an ESP device fails which results in a complete service interruption and potentially significant data loss. The data loss can be catastrophic when the streamed data is supporting mission critical operations, such as those in support of an ongoing manufacturing or drilling operation. An example of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, one or more processors and one or more computer-readable mediums operably coupled to the one or more processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
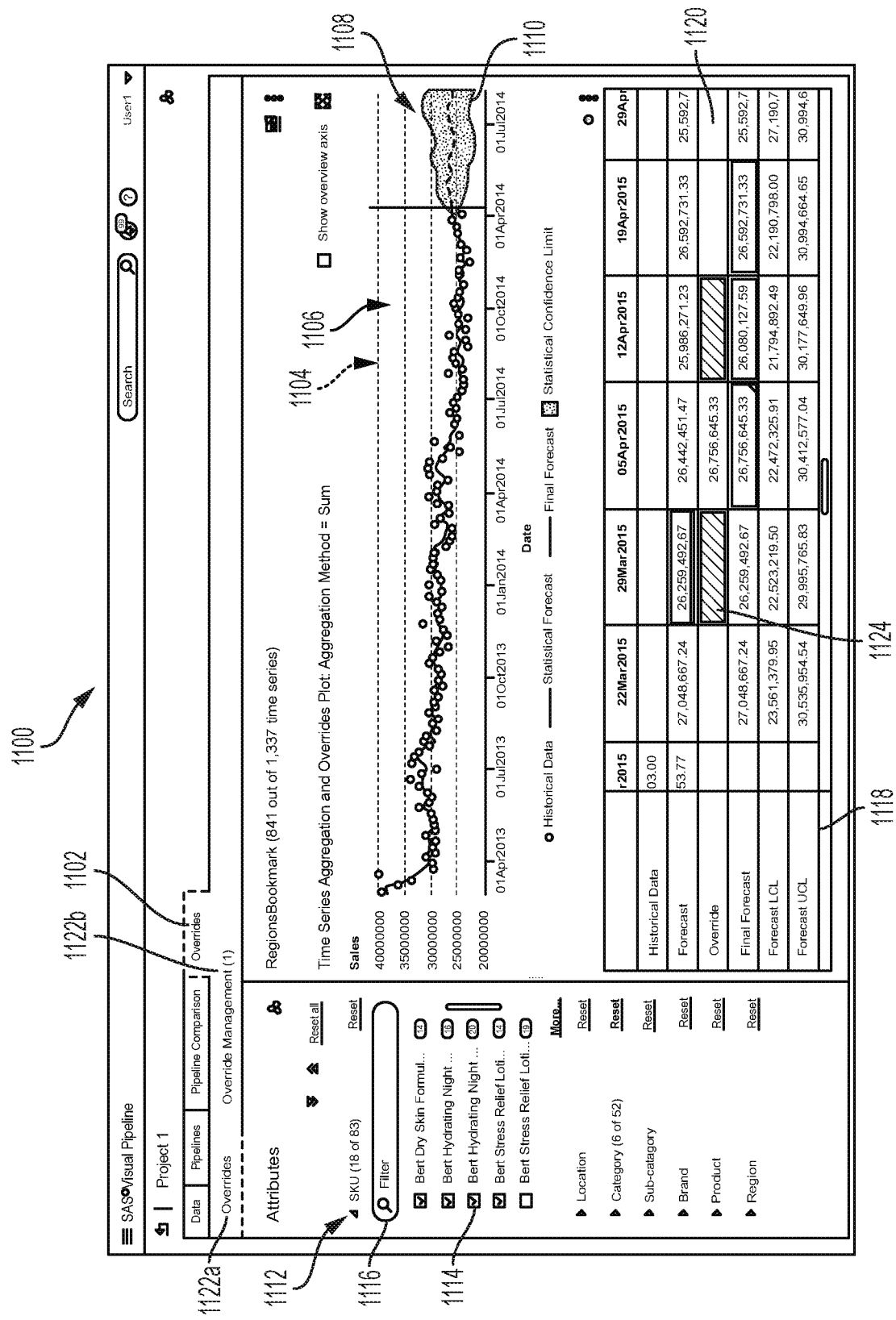
FIG. 11 is an example of an interactive graphical user-interface for analyzing and manipulating time-series projections according to some aspects.

FIG. 11 is an example of an interactive graphical user-interface (GUI) 1100 according to some aspects of the present disclosure. The GUI 1100 can be a visual interface for a GUI system that can include software components, hardware components (e.g., one or more processors), or any combination of these. In some examples, the GUI system can call application programming interfaces (APIs) to perform various functions. For example, the GUI system can transmit a request to a representational state transfer (REST) API and receive back a response, which the GUI system can use to perform a particular operation. In some examples, the GUI system can form a collaborative environment (e.g., a web-based collaborative environment) through which multiple users can access and manipulate information. Each user can have an account with predefined permissions that enable the user to perform one or more operations using the GUI system. A user can login to collaborative environment by entering login credentials or otherwise authenticating with the collaborative environment. After logging in, the user may be presented with a graphical user interface that is similar to the GUI 1100.

The GUI 1100 can include one or more tabs 1102 through which a user can access various pages of the GUI 1100. In this example, the "Overrides" tab is selected and corresponding information is presented in the GUI 1100. In the "Overrides" tab, a user can view, enter, or adjust manual overrides of information displayed in the GUI 1100, as discussed in greater detail below. The GUI 1100 can also include one or more sub-tabs, such as the "Overrides" sub-tab 1122a and the "Override Management" sub-tab 1122b. In this example, the "Overrides" sub-tab 1122a is selected and corresponding information is presented in the GUI 1100.

Within the "Overrides" tab 1122a can be one or more graphs, such as graph 1104. The graph 1104 can be a line graph or another type of graph. The graph 1104 can depict a time series, which can be formed from historical time-series data 1106, projected time-series data 1108, or both. For example, the graph 1104 can include historical time-series data 1106 indicating actual demand for a product over a prior time period (e.g., between May 31, 2013 and Apr. 1, 2014) to the left of a divider line. The graph 1104 can also include projected time-series data 1108 indicating projected demand for the product over a future time period (e.g., between Apr. 2, 2014 and Jul. 15, 2014) to the right of the divider line. The divider line can help distinguish between the historical time-series data 1106 and the projected time-series data 1108. The graph 1104 may also include a confidence region 1110 indicating the statistical confidence limits associated with the projected time-series data 1108.

In some examples, the GUI system can generate the historical time-series data 1106 by aggregating data from various historical time-series. For example, the GUI system can obtain multiple historical time-series relating to executions of software by computing systems during a prior time-period. The GUI system can then aggregate data points from the multiple historical time-series to form the historical time-series data 1106 in the graph 1104. Two possible examples of approaches for aggregating time-series data are shown below:

$$TOTAL = \sum_{i=1}^{N} y_{i,t} \text{ or}$$

$$AVERAGE = \frac{1}{N}\sum_{i=1}^{N} y_{i,t}$$

where TOTAL is the summed result of the values of the data points at position i in N time series; and AVERAGE is the average of the values of the data points at position i in N time series. In some examples, the GUI system can indicate which approach is being used to perform the aggregation. For example, in FIG. 11, the GUI 1100 includes the phrase "Time Series Aggregation and Overrides Plot: Aggregation Method=Sum," which can indicate that the GUI system performed the aggregation using the first (TOTAL) approach. After performing the aggregation, the GUI system can display the resulting historical time-series data 1106 in the graph 1104. Because the historical time-series data 1106 is generated by aggregating data from various historical time-series, it can be referred to as an aggregated historical time-series.

In some examples, the GUI system can generate the projected time-series data 1108 by applying one or more forecasting techniques to the historical time-series data 1106. For example, the GUI system can use an autoregressive integrated moving average (ARIMA) model, an ARIMAX model, an exponential smoothing model (ESM), or any combination of these to produce the projected time-series data 1108. In other examples, the GUI system can apply one or more forecasting techniques to the various historical time-series used to generate the historical time-series data 1106, which in turn produces multiple projected time-series. The GUI system can then aggregate the multiple projected time-series to form the projected time-series data 1108. The GUI system may perform this aggregation using either of the abovementioned techniques, in some examples. Regardless of the approach taken, the projected time-series data 1108 can be referred to as an aggregated time-series projection.

In some examples, the GUI system can use both of the above-mentioned approaches to determine the aggregated time-series projection. For example, the GUI system can use the first approach to determine a first set of projected time-series data. The GUI system can also use the second approach to determine a second set of projected time-series data, which may be different from the first set of projected time-series data. The GUI system can then implement a reconciliation process (e.g., top-down reconciliation or bottom-up reconciliation) to reconcile the differences between the two sets of projected time-series data, which can result in the aggregated time-series projection. The GUI system may additionally or alternatively implement a reconciliation process to reconcile differences in various distributional properties associated with the first set and the second set of projected time-series data. Examples of the distributional properties can include variances, prediction standard errors, and confidence limits. In this manner, the GUI system can automatically (e.g., with little or no human involvement) perform various functions, including but not limited to automatically generating the aggregated historical time-series, automatically generating the aggregated time-series projection, and automatically determining distributional properties associated with the aggregated time-series projection.

The GUI 1100 can include various GUI components that enable a user to select which historical time-series to use to generate the graph 1104 (e.g., the aggregated historical time-series and the aggregated time-series projection in the graph 1104). And because the historical time-series are selected by the user, these time series may or may not have a hierarchical relationship to one another. For example, the GUI 1100 can include groups 1112, menus, checkboxes, and search bars 1116, which can enable the user to identify and select certain historical time-series for use. In the example shown in FIG. 11, there are seven groups, but other examples can have more, fewer, or different groups. The GUI system can detect a selection of a group and responsively display a list of some or all of the historical time-series within the group in the GUI 1100. The user can then select a checkbox 1114 adjacent to a historical time-series in order to use that historical time-series for generating the graph 1104. Additionally or alternatively, the GUI system can receive filter criteria in the search bar 1116, filter through the historical time-series based on the filter criteria, and output the relevant results in the GUI 1100. This can help the user to quickly and easily identify a desired historical-time series for use in generating the graph 1104.

The GUI 1100 can also include a data table 1118 with information about the data points in the graph 1104. For example, the data table 1118 can include textual representations of the values of (i) the data points in the aggregated historical time-series; (ii) the data points in the aggregated time-series projection; (iii) the lower-confidence limits (LCL) in the confidence region 1110; (iv) the upper-confidence limits (UCL) in the confidence region 1110; or (v) any combination of these. In the example shown in FIG. 11, the first row of the data table 1118 has the values of the data points in the aggregated historical time-series, the second row of the data table 1118 has the values of the data points in the aggregated time-series projection, the fifth row of the data table 1118 has the values of the lower-confidence limits in the confidence region 1110, and the sixth row of the data table 1118 has the values of the upper-confidence limits in the confidence region 1110. The data table 1118 also has other values in the third and fourth rows, which are discussed in greater detail below. By providing both graphical and textual representations of this information in the same GUI 1100, a user can derive the analytical benefits of both modalities. For example, the user may be able to identify trends or patterns by analyzing the graph 1104, and specific values by analyzing the data table 1118.

In some examples, the data table 1118 can include an Override row, which is the third row of the data table 1118 shown in FIG. 11. The Override row can enable a user to manually enter an override value for a data point depicted in the graph 1104. For example, each cell 1120 in the Override row can be a user input box into which a user can manually type an override value for a corresponding data point displayed in the graph 1104. In some examples, the GUI system may not allow data points in the aggregated historical time-series to be overridden, because those data points are based on actual events that already occurred ("the past cannot be changed"). Additionally or alternatively, the data table 1118 can include a Final Forecast row, which is the fourth row of the data table 1118 shown in FIG. 11. The Final Forecast row can show the value of the data point after being overridden with an override value. As a particular example, a user may have entered the override value "26,756,645.33" into the override cell in the column "05Apr2015" of the data table 1118. In response, the GUI system has updated the graph 1104 accordingly and changed the corresponding value in the Final Forecast row from "26,442,451.47" to "26,756,645.33." A similar process may have occurred with respect to the column "12Apr2015" of the data table 1118. And, in this example, the rest of the values shown in the Final Forecast row are the same as the corresponding values in the Forecast row, since a user has not manually overridden those values.

Figure 12:
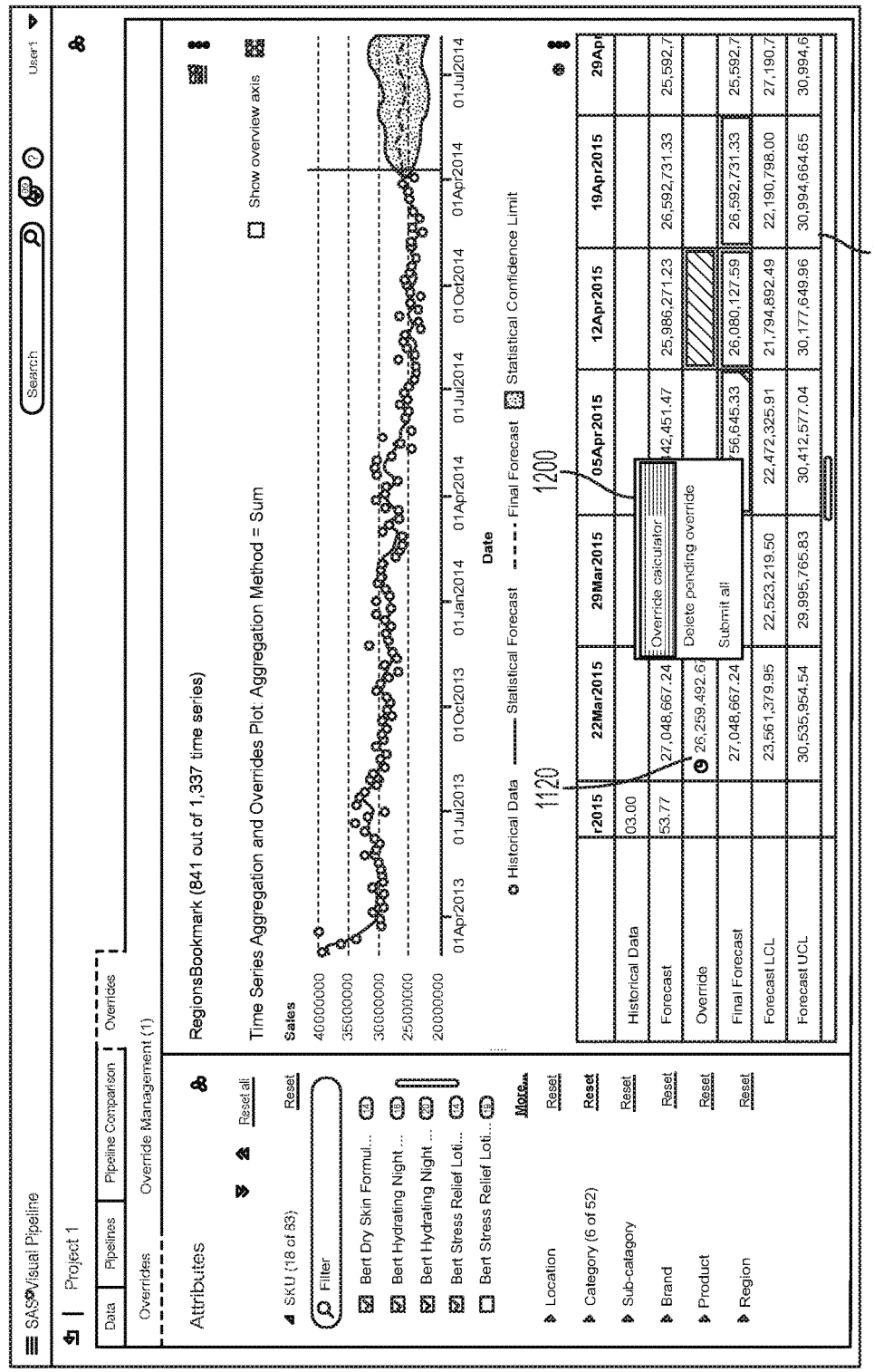
FIG. 12 is an example of a menu in an interactive graphical user-interface according to some aspects.

In some examples, rather than directly entering an override value into a cell 1120, a user may be able to interact with the cell 1120 to launch an override dialog-box. For example, a user can right click on a cell 1120 in the data table 1118 and the GUI system can responsively present a menu of options in the GUI 1100. One example of the menu 1200 is shown in FIG. 12. In this example, the options include "override calculation" for launching an override dialog-box, "delete pending override" for deleting a pending override, and "submit all" for submitting one or more overrides. But other examples can include more, fewer, or different options. A user can select the "override calculation" option and the GUI 1110 can responsively display an override dialog-box, such as the override dialog-box 1300 shown in FIG. 13.

Figure 13:
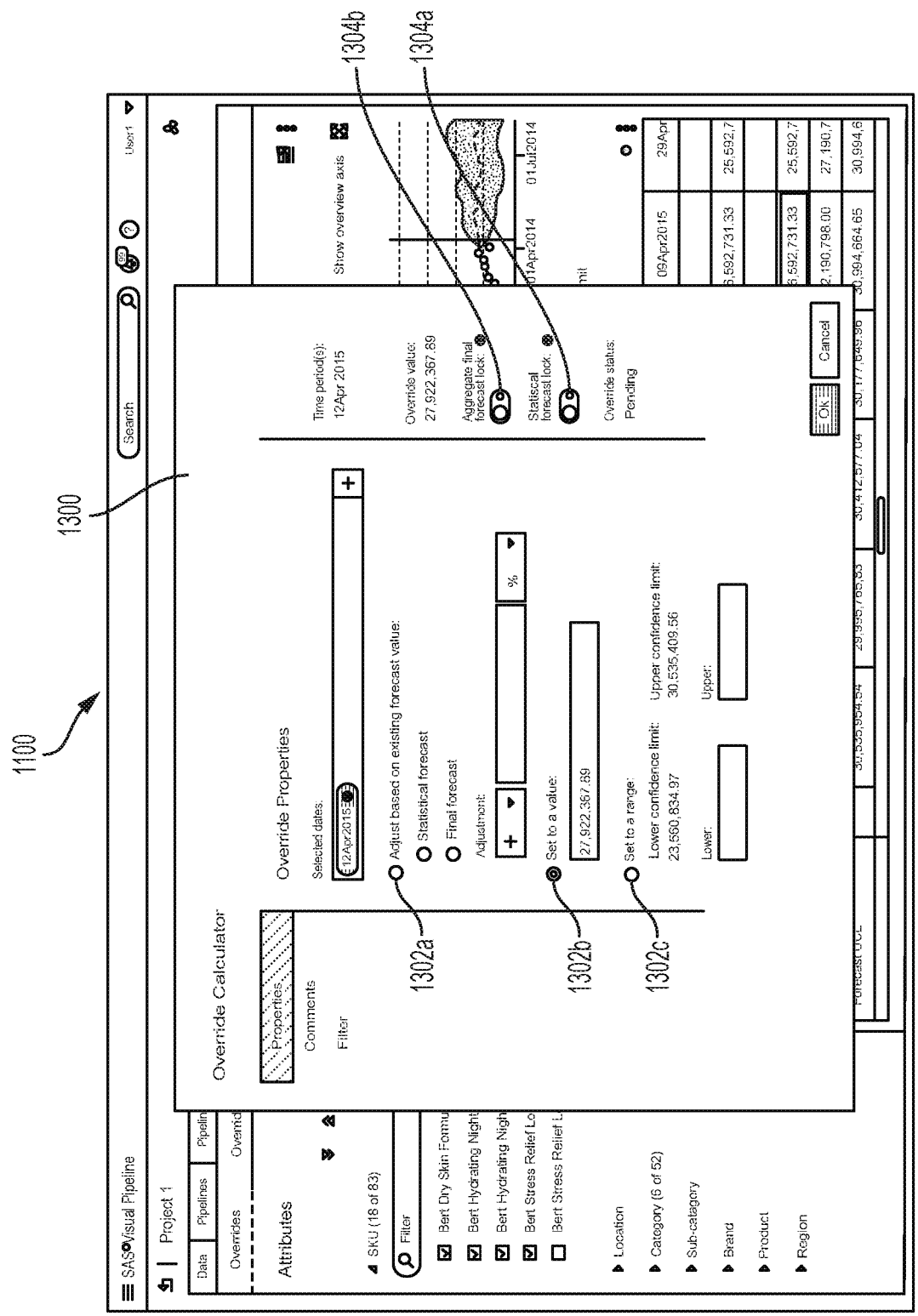
FIG. 13 is an example of a menu in an override dialog-box according to some aspects.

In the example shown in FIG. 13, the override dialog-box 1300 indicates a date (Apr. 12, 2015) for a data point in the aggregated time-series projection that has a value to be overridden. The override dialog-box 1300 also provides multiple ways in which a user can override the data point. For example, the override dialog-box 1300 can include a first approach associated with the first radio button 1302*a* in which the user can adjust an existing value of the data point by adding or subtracting a certain percentage from the existing value. As a particular example, the user can input that 2.2% is to be added to the existing value. The GUI system can receive the input and responsively adjust the existing value by the certain percentage. Additionally or alternatively, the override dialog-box 1300 can include a second approach associated with the second radio button 1302*b* in which the user can override an existing value with an exact value. For example, the user can input that the existing value is to be overridden with the value "27,922,367.89." The GUI system can receive the input and responsively adjust the existing value to the override value. Additionally or alternatively, the override dialog-box 1300 can include a third approach associated with the third radio button 1302*c* in which the user can set a range in which the existing value must fall. The range can be greater than or less than the range corresponding to the confidence region. As a particular example, the user can input that the existing value is to fall within a range between 27,000,000 and 29,000,000. The GUI system can receive the range and responsively adjust the existing value to be within the range, if needed. In other examples, the override dialog-box 1300 can include more, fewer, or different options for adjusting an existing value of a data point.

The override dialog-box 1300 may also include an option 1304*a* for locking the values of the aggregated time-series projection so that they cannot be edited or overridden. This may also prevent one or more time series (e.g., the historical time-series, multiple projected time-series, or both) that were used to generate the aggregated time-series projection from being edited or overridden. Additionally or alternatively, the override dialog-box 1300 can include an option 1304*b* for locking the values of the final forecast so that they cannot be edited or overridden. This may also prevent one or more time series that were used to generate the final forecast from being edited or overridden. These options can prevent accidental or purposeful overwrites of potentially important information. The override dialog-box 1300 can further include a comments tab that enables a user to leave a comment about an override, which can provide details to other users about why the override was made.

After making the desired adjustments using the override dialog-box 1300, the user can press the "OK" button to apply the adjustments. This may result in one or more overrides being displayed in the data table 1118 with a pending status (e.g., an adjacent clock icon), until the override is finally applied. But the override may not be immediately applied, in some examples. Instead, the override can be analyzed to ensure that various overrides do not conflict with one another. For example, one user may try to override an existing value with a first value (e.g., 27,000,000), while another user may try to adjust the existing value by a certain percentage (e.g., 2.2%) that results in a second value of 27,502,112. Because the first value and second value are different from one another, the GUI system can detect a conflict. As another example, a user may try to override one existing value in the aggregated time-series projection with a first value, and another existing value in the aggregated time-series projection with a second value that is incompatible with the first value. So, the GUI system can detect the conflict.

Figure 14:
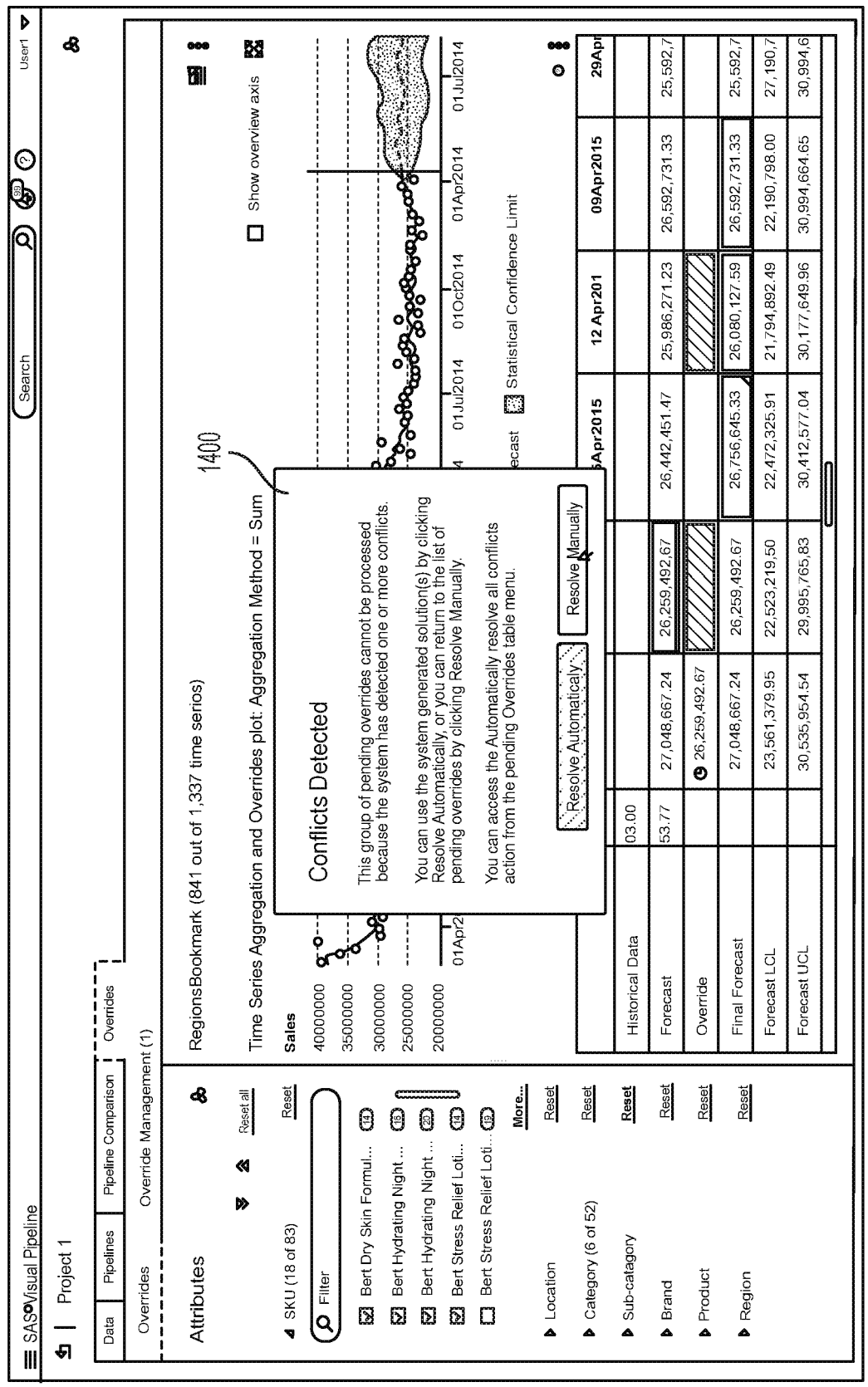
FIG. 14 is an example of a message popup according to some aspects.

If a conflict is detected, the GUI system can display a message to alert the user. And in some examples, the message can also provide the user with options to resolve the conflict. One example of such a message 1400 is shown in FIG. 14. In this example, the message 1400 includes two options: "Resolve Automatically" for resolving the conflict(s) automatically, and "Resolve Manually" for allowing the user to manually resolve the conflict(s). But the message 1400 can additionally or alternatively include a "Discard" option for discarding the override value that caused the conflict, without applying the override value. In some examples, if the Resolve Automatically option is selected, the GUI system can automatically analyze the conflict and adjust one or more of the conflicting values (or relax one or more constraints) until a resolution to the conflict is attained. For example, the GUI system can iteratively adjust one or more of the conflicting values until the conflict is eliminated or within an acceptable tolerance-range. If the Resolve Manually option is selected, the GUI system can present information to enable the user to manually resolve the conflict.

Figure 16:
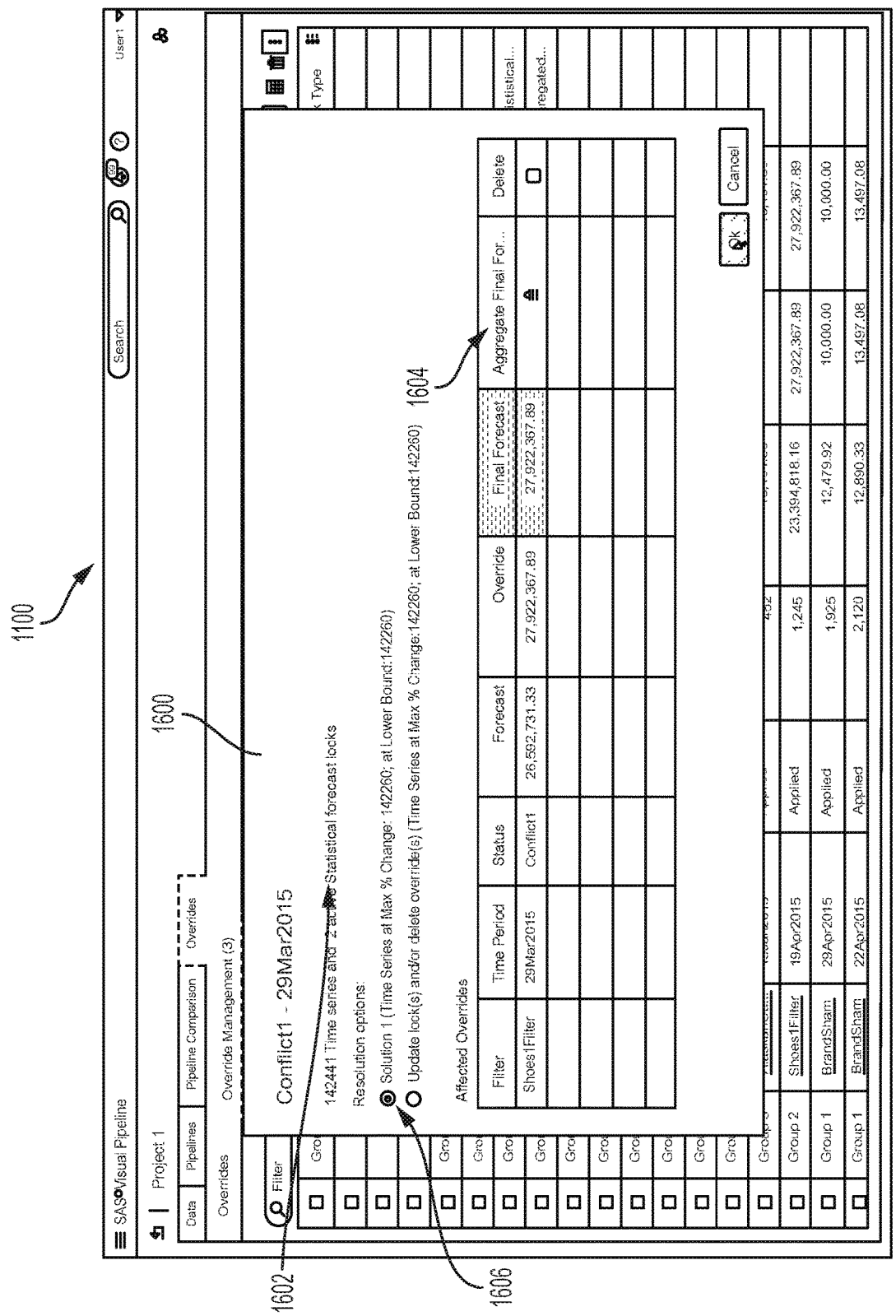
FIG. 16 is an example of a conflict-resolution dialog box according to some aspects.

For example, the GUI system can launch the Override Management sub-tab 1122*b*, as shown in FIG. 15. The Override Management sub-tab 1122*b* can have a menu 1502 with one or more options. Examples of the options include "automatically resolve all conflicts" for causing the GUI system to automatically analyze and resolve one or more conflicts that it previously identified; "view override logs" for presenting logs of overrides and adjustments to overrides; and "impact analysis" for presenting an impact-analysis page (e.g., as discussed in greater detail below). The GUI 1100 can also include an overrides data table 1504. The overrides data table 1504 can include textual information relating to previous overrides, whether those overrides have been applied, and whether a conflict exists. In this example, the GUI system has detected a conflict 1506 associated with a data point for Apr. 19, 2015 and highlighted this conflict for the user. The user may then select this conflict 1506, which can cause the GUI system to launch a conflict-resolution dialog box. An example of a conflict-resolution dialog box 1600 is shown in FIG. 16. The conflict-resolution dialog box 1600 can include indications 1602, 1604 of what override locks are being enforced. The GUI 1100 can also include options 1606 for resolving the conflict. The GUI system can automatically identify and present these options 1606 based on the detected conflict. The user can select one of the options 1606 and then press an "OK" button, which can cause the GUI system to resolve the conflict in accordance with the selected option.

After the GUI system detects that the user pressed the "OK" button, in some examples, the GUI system can re-present the Override Management sub-tab 1122*b* (e.g., as shown in FIG. 15), but with the status of the data point changed from indicating a conflict to indicating that the override is pending submission. This can indicate to the user that the override is ready to be submitted. The "Submit Pending" button 1508 may be enabled at this time. A user can press the button, which can cause the GUI system to submit the one or more overrides.

Figure 17:
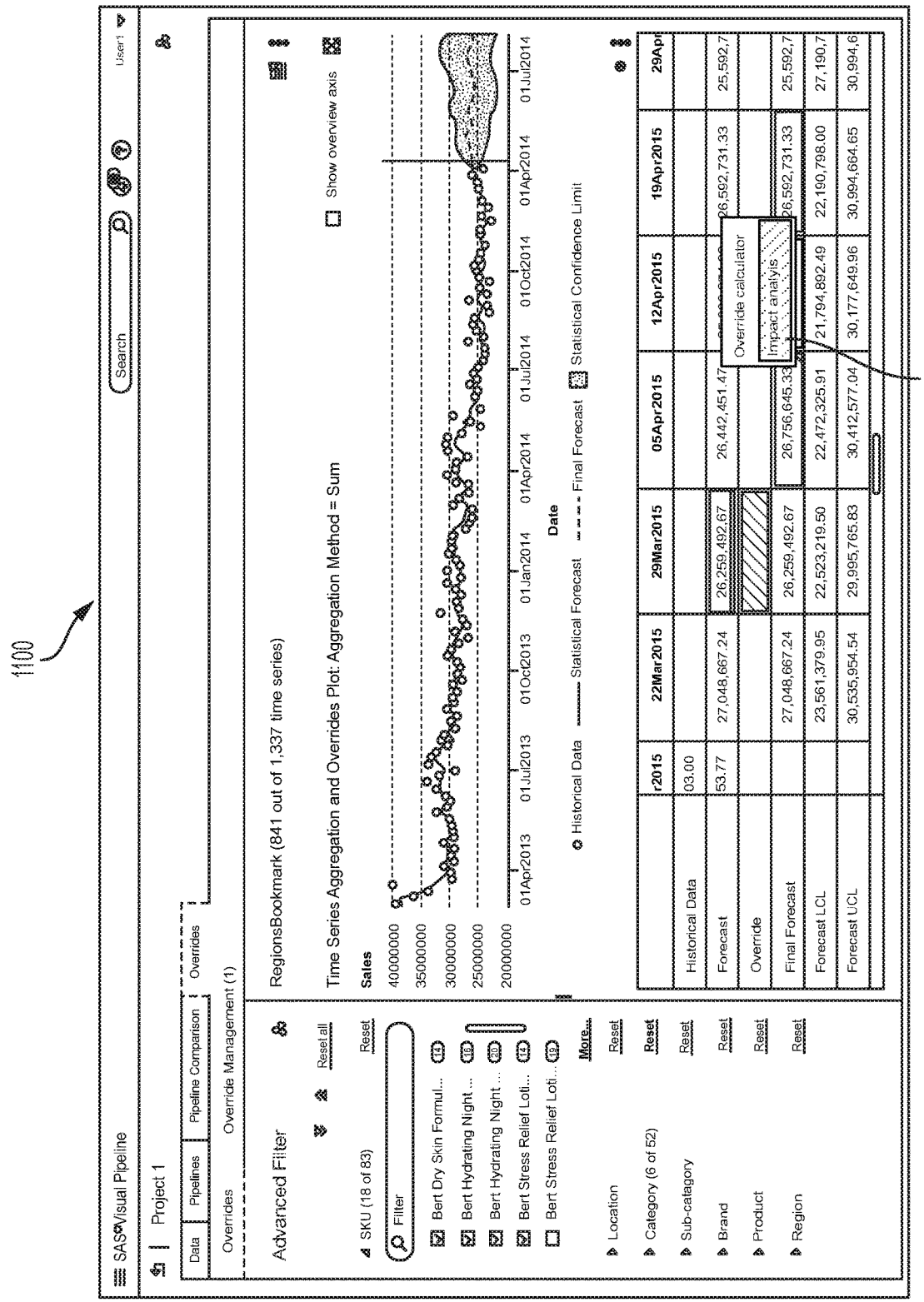
FIG. 17 is an example of a menu with an impact-analysis option according to some aspects.
Figure 18:
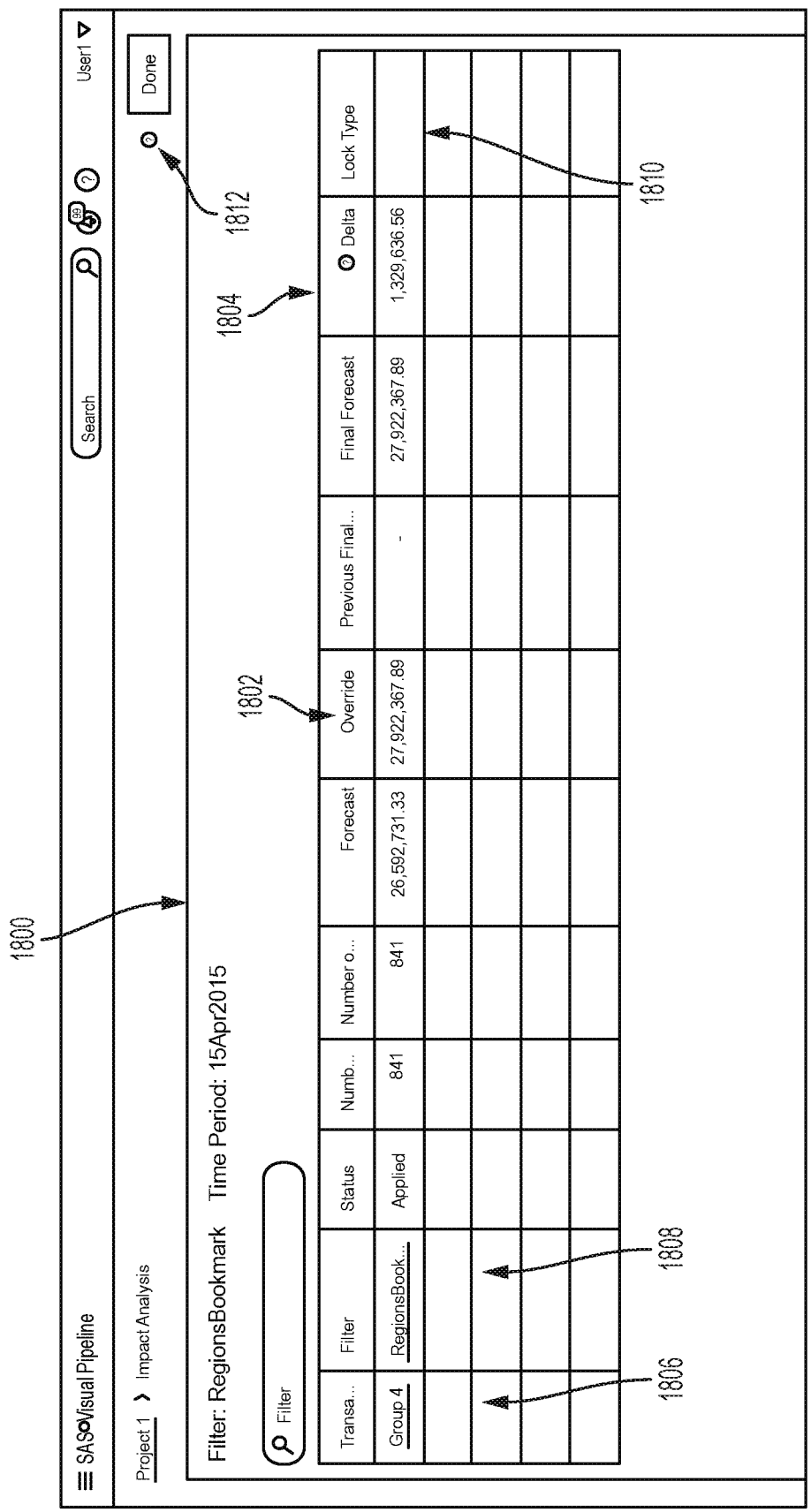
FIG. 18 is an example of an impact-analysis page 1800 according to some aspects.

As alluded to above, in some examples the GUI system can present an impact-analysis page describing how one or more overrides (e.g., constraints) impacted values in one or more time series. The user can access the impact-analysis page one or more ways (e.g., via the menu 1502 shown in FIG. 15 or the other menu 1702 shown in FIG. 17). One example of an impact-analysis page 1800 is shown in FIG. 18. The impact-analysis page 1800 can show an override 1802 applied to a time series, a difference 1804 between a projected ("forecasted") value and the override value, a transaction-group identifier 1806 that can identify a transaction group associated with the override, a filter-group identifier 1808 that can identify a filter group associated with the override, or any combination of these. The impact-analysis page 1800 can additionally or alternatively provide other information, such as an indicator 1810 of whether one or more override locks are applied to a particular override. In some examples, the impact-analysis page 1800 can include a help icon 1812 that is selectable for providing detailed information about the impact-analysis page 1800. After the user has reviewed the impact-analysis page 1800, the user can select a "Done" button to go to another page (e.g., the Overrides page shown in FIG. 11).

In some examples, the abovementioned functionality of the GUI system can be implemented by a processing device performing some or all of the operations discussed below with respect to FIG. 19. Other examples can include more operations, fewer operations, or a different order of the operations shown in FIG. 19. The operations of FIG. 19 are described with reference to the GUI components discussed above.

In block 1902, the processing device renders a graphical user interface (GUI) 1100 on a display device, such as a touch-screen display, a liquid crystal display (LCD), a computer monitor, or any combination of these. The GUI 1100 can have a graph 1104 that includes an aggregated time-series projection (e.g., formed from projected time-series data 1108). The aggregated time-series projection can be generated at least in part by aggregating multiple time-series.

In block 1904, the processing device determines if a user input has been received via an input element of the GUI 1100. The user input can be associated with a data point on the graph 1104. In one example, the input element can be a cell 1124 in a data table, such as data table 1118. In other examples, the input element can be an input box, radio button, check box, or another type of element. For example, the input element can be the input box adjacent to radio button 1302*b* in the override dialog-box 1300 of FIG. 13. If the processing device determines that the user input has been received, the process can continue to block 1906. Otherwise, the process can await the user input.

In block 1906, the processing device can adjust the aggregated time-series projection based on the user input to create an updated version of the aggregated time-series projection. For example, the processing device can replace a value of the data point in the aggregated time-series projection with a new value to create the updated version of the aggregated time-series projection.

In block 1908, the processing device can render an updated version of the graph 1104 in the GUI 1100. The updated version of the graph 1104 can visually depict the updated version of the aggregated time-series projection. In some examples, the graph 1104 can include both the prior and the updated versions of the aggregated time-series projection (e.g., overlaid using different colors or patterns) to enable a user to visually identify distinctions between the two versions.

In block 1910, the processing device modifies one or more data points in a group of time series used to form the aggregated time-series projection based on the user input. More specifically, in some examples, overriding the value of a data point in the aggregated time-series projection may require the values of corresponding data points in the group of time series to also be adjusted (e.g., to maintain a relationship between the aggregated time-series projection and the group of time series). As a particular example, the aggregated time-series projection may have a particular value for the date Apr. 7, 2017. And the user may try to override that value by increasing it by 2.7%. In order to implement that override and maintain the existing relationship (e.g., hierarchical or non-hierarchical relationship) between the aggregated time-series projection and the group of time series, some or all of the values of the data points associated with the date Apr. 7, 2017 in the group of time series may also need to be increased by 2.7%. So, the processing device can also increase the values of these data points by 2.7%. In this manner, the processing device can identify which data points, in which underlying time-series, should be modified in order to result in the adjustment to the aggregated time-series projection provided by the user. The processing device can then make these modifications to the underlying time-series. This process of propagating the impact of an override through the underlying time-series can be referred to as disaggregating the override.

How the impact of an override is propagated through the group of underlying time-series can depend on various factors, such as one or more constraints (e.g., locks and overrides) on one or more time series in the group. For example, a constraint can be applied to a time series in the group. The constraint may limit the amount the time series can be adjusted to within a particular range, or prevent the time series from being adjusted at all (e.g., if the constraint is a lock). In some examples, this may not conflict with the desired override-value. But in other examples, it may prevent the desired override-value from being attained, thereby causing a conflict. As discussed above, the conflict can be automatically resolved by the processing device or manually resolved by the user. In one such example, the processing device can automatically resolve the conflict by determining values for data points in the group of time series that both (i) respect some or all of the constraints, and (ii) result in an alternative override-value for the aggregated time-series projection that is as close as possible to (but still different from) the override value provided by the user. The processing device can then use this alternative override-value in the aggregated time-series projection, rather than the override value provided by the user.

In some examples, multiple users can use the GUI 1100 to apply overrides (or locks) to a data point in a time series among the group of time series. And these overrides may be different from one another. So, the processing device may average these override values to arrive at a compromised override-value for the data point. Then, any other constraints on the data point or time series (e.g., supplied by the users) can then be applied to the compromised override-value to generate a final override-value for the data point. The final override-value can be used to generate the updated version of the aggregated time-series projection.

In block 1912, the processing device detects whether a user interaction with a GUI object has occurred. Examples of the GUI object can be the menu 1502 of FIG. 15 and the menu 1702 of FIG. 17. The GUI object can be for presenting an impact analysis portion of the GUI 1100, such as the impact-analysis page 1800. The impact analysis portion can indicate an impact of an override on the aggregated time-series projection, the group of time series, or any combination of these. If the processing device has detected the user interaction, the process can continue to block 1914. Otherwise, the process can return to an earlier block or await the user interaction.

In block 1914, the processing device visually presents the impact analysis portion of the GUI 1100. For example, the processing device can visually hide the graph 1104 and visually display a data table in the GUI 1100. The data table can have values for one or more data points in the group of time series, among other information, for example as shown in FIG. 18.

Example Approaches for Disaggregating an Override

Some examples of the present disclosure can involve disaggregating an override to a higher-level time-series through one or more lower-level time-series, for example, as discussed above with respect to FIG. 19. More specifically, an override to a higher-level time-series may need to be disaggregated through lower-level time-series in order to reconcile the lower-level time-series with the override. This can be achieved in any number of ways, including but not limited to: (i) sequentially applying individual overrides to lower-level time-series one override at a time, (ii) simultaneously applying a group of overrides to lower-level time-series, or (iii) combining the above approaches by sequentially applying groups of overrides to lower-level time-series one group at a time. Various illustrative scenarios are described below to provide examples of disaggregating an override through lower-level time-series.

A first scenario can involve lower-level time-series that have no constraints, such that the lower-level time-series can be adjusted as needed to satisfy the overrides at higher levels. In this scenario (and other scenarios discussed below), an override may be disaggregated to the lower-level time-series using proportional disaggregation, equal disaggregation, or confidence-interval disaggregation.

Proportional disaggregation can involve each lower-level time-series being modified by the same percentage. As a particular example, a data point in an aggregated time-series projection can have a value of 100. And each of the lower-level time-series used to form the aggregated time-series projection have corresponding data points with the values (10, 10, 20, 20, and 40), respectively. If the value of the data point in the aggregated time-series projection is increased (e.g., overridden) from 100 to 150, the lower-level time-series can be adjusted to (15, 15, 30, 30, and 60), respectively, such that each lower-level time-series has been increased by 50%.

Equal disaggregation can involve each lower-level time-series being modified by the same value. As a particular example, a data point in an aggregated time-series projection can have a value of 100. And each of the lower-level time-series used to form the aggregated time-series projection have corresponding data points with the values (10, 10, 20, 20, and 40), respectively. If the value of the data point in the aggregated time-series projection is increased from 100 to 150, the lower-level time-series can be adjusted to (20, 20, 30, 30, and 50), respectively, such that each lower-level time-series has been increased by 10.

Confidence-interval disaggregation can involve the confidence interval for each lower-level time-series being modified proportionally. As a particular example, a data point in an aggregated time-series projection can have a value of 100. And each of the lower-level time-series used to form the aggregated time-series projection have corresponding data points with the values (10, 10, 20, 20, and 40), respectively. The confidence intervals at the lower levels can be {(5, 15), (0, 20), (10, 30), (0, 40), (20, 60)}. So, the widths of confidence intervals at the lower levels are (10, 20, 20, 40, and 40). If the value of the data point in the aggregated time-series projection is increased from 100 to 150, the increase of 50 can be distributed in proportion to the width of confidence intervals at the lower levels. This can result in changed values of (10+50*10/130, 10+50*20/130, 20+50*20/130, 20+50*40/130, 40+50*40/130), which calculates to (13.85, 17.69, 27.69, 35.38, 55.38).

A second scenario can involve a user having fixed the first two lower-level time-series at the current values of 10 each, and having changed the third value from 20 to 30, resulting in the values (10, 10, 30, 20, and 40), respectively. If the value of the data point in the aggregated time-series projection is increased from 100 to 150, the lower-level time-series values need to be adjusted in view of the first three values being fixed at 10, 10, and 30, respectively. This can be achieved using, for example, proportional disaggregation in which the remaining two values of 20 and 40 are proportionally increased to yield a total of 150. This can result in values of (10, 10, 30, 20+(100-60)*20/60, 40+(100-60)*40/60), which calculates to (10, 10, 30, 33.33, 66.67).

A third scenario can involve two overlapping overrides being applied sequentially to the lower-level time-series. As a particular example, each of the lower-level time-series can have data points with the values (10, 10, 20, 20, and 40), respectively. A first override can increase the aggregate value of the first three data-point values by 50% (e.g., the aggregate value of 10+10+20=40 is increased to 60). A second override can next double the aggregate value of the last three data-point values. Since the third data-point value has already been increased to 30 per the first override, the aggregate value of last three lower-level forecasts is 30+20+40=90, which doubles to 180 per the second override. This can result in values of (15, 15, 60, 40, and 80), respectively.

A fourth scenario can involve two overlapping overrides being applied simultaneously to the lower-level time-series. As a particular example, each of the lower-level time-series can have data points with the values (10, 10, 20, 20, and 40), respectively. One override can increase the aggregate value of the first three data-point values by 50%. Another override can next double the aggregate value of the last three data-point values. The third data-point value (e.g., the value of 20) is common to both of these overrides, with a desired value of 30 for one override and a desired value of 40 the other override. Applying these overrides simultaneously can involve reaching a compromise, in which the third data-point value is a "middle ground" of the desired values of two overrides and the other four data-point values are adjusted accordingly. The resulting values can be (13, 13, 34, 42, and 84). The first two values increased less than 50% because third value increased more than 50%. And the last two values increased more than 100% because third value increased less than 100%.

A fifth scenario can involve sequentially applying groups of overrides, where the overrides in a particular group are applied simultaneously to one another. One example can involve a group of overrides being applied simultaneously (e.g., as discussed in Scenario 4). Then, additional overrides can be applied to the result to make further adjustments, where the additional overrides are applied sequentially to the prior overrides.

In some examples, a group of overrides can be simultaneously applied using the following optimization formulation:

$f_j$=current value of lower-level time-series j
$L_j$=lower end of the confidence interval of lower-level time-series j
$U_j$=Upper end of the confidence interval of lower-level time-series j
$O_i$=Aggregate value of override i
$I$=Set of overrides applied simultaneously
$S_i$=Set of lower-level time-series affected by override i. The lower-level time-series $j \in S_i$ if lower-level time-series j is affected by override i.
$d_{ij}$=desired value of lower-level time-series j for override i where desired value is obtained by disaggregating the override to low level using any one of the specified disaggregation methods discussed above.
$x_j$=override value of lower-level time-series j An objective function can minimize the deviations of override values $x_j$ from the desired values $d_{ij}$ as follows:

Proportional disaggregation:

$$\text{Minimize} \sum_{i \in I} \sum_{j \in S_i} \frac{(d_{ij} - x_j)^2}{f_j}$$

Equal disaggregation: Minimize $\Sigma_{i \in I} \Sigma_{j \in S_i} (d_{ij} - x_j)^2$ Confidence-interval disaggregation:

$$\text{Minimize} \sum_{i \in I} \sum_{j \in S_i} \frac{(d_{ij} - x_j)^2}{(U_j - L_j)}$$

In some examples, the following constraint can be used to require that override values at a lower level sum to the desired aggregate-value of the override:

$\Sigma_{j \in S_i} x_j = O_i \forall i \in I$

In some examples, the following constraint can be used to require that all lower-level override values remain non-negative:

$x_j \geq 0 \forall j$

Some examples of the present disclosure can enable an override to be locked, for example, if a user does not want to have subsequent overrides change the aggregate value of a locked override. Locked overrides can be simultaneously applied with some or all subsequent groups of overrides, so that the locked values are maintained.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. And the examples disclosed herein can be combined or rearranged to yield additional examples.

GENERAL

In the previous description, for the purposes of explanation, specific details are set forth in order to provide a thorough understanding of examples of the technology. But various examples can be practiced without these specific details. The figures and description are not intended to be restrictive.

The previous description provides examples that are not intended to limit the scope, applicability, or configuration of the disclosure. Rather, the previous description of the examples provides those skilled in the art with an enabling description for implementing an example. Various changes may be made in the function and arrangement of elements without departing from the spirit and scope of the technology as set forth in the appended claims.

Specific details are given in the previous description to provide a thorough understanding of the examples. But the examples may be practiced without these specific details. For example, circuits, systems, networks, processes, and other components can be shown as components in block diagram form to prevent obscuring the examples in unnecessary detail. In other examples, well-known circuits, processes, algorithms, structures, and techniques may be shown without unnecessary detail in order to avoid obscuring the examples.

Also, individual examples may have been described as a process that is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. And a process can have more or fewer operations than are depicted in a figure. A process can correspond to a method, a function, a procedure, a subroutine, a subprogram, etc. When a process corresponds to a function, its termination can correspond to a return of the function to the calling function or the main function.

Systems depicted in some of the figures can be provided in various configurations. In some examples, the systems can be configured as a distributed system where one or more components of the system are distributed across one or more networks in a cloud computing system.

The invention claimed is:

1. A non-transitory computer-readable medium comprising program code that is executable by a processing device for causing the processing device to:
generate a graphical user-interface (GUI) that includes:
a graph depicting an aggregated time-series projection over a future period of time, the aggregated time-series projection being generated at least in part by aggregating a plurality of time series;
an input element for receiving user input associated with a data point in the aggregated time-series projection;
a GUI object for presenting an impact analysis portion of the graphical user-interface;
receive the user input via the input element of the GUI, the user input indicating that an existing value for the data point in the aggregated time-series projection is to be overridden with an override value that is different from the existing value of the data point;
based on receiving the user input via the input element:
adjust the aggregated time-series projection using the override value for the data point to generate an updated version of the aggregated time-series projection;
render an updated version of the graph in the GUI, wherein the updated version of the graph visually depicts the updated version of the aggregated time-series projection; and update data points in the plurality of time series by propagating an impact of overriding the existing value of the data point with the override value through the plurality of time series based on respective relationships between the aggregated time-series projection and the plurality of time series; and based on detecting a user interaction with the GUI object, visually present the impact analysis portion of the graphical user-interface, the impact analysis portion visually representing respective impacts of overriding the existing value of the data point with the override value on each time series in the plurality of time series, the respective impacts being visually represented at the same time within the impact analysis portion;

receive another user input indicating that another value for another data point in the aggregated time-series projection is to be overridden with another override value;

determine that the other override value conflicts with a particular constraint of one or more predefined constraints; and generate, in the GUI, a table that includes a plurality of statuses for a plurality of override values provided as user inputs and associated with different dates, each status in the plurality of statuses indicating whether a corresponding override value in the plurality of override values conflicts with at least one constraint of the one or more predefined constraints, wherein the table includes a status indicating that the other override value conflicts with the particular constraint of the one or more predefined constraints.

2. The non-transitory computer-readable medium of claim 1, further comprising program code that is executable by the processing device for causing the processing device to:
receive a plurality of constraints; and
responsive to receiving the plurality of constraints, update values of a plurality of data points in the plurality of time series by adjusting the values subject to the plurality of constraints;
wherein the impact analysis portion of the graphical user-interface visually indicates respective influences of the plurality of constraints on the values of the plurality of data points, the respective influences being visually indicated at the same time in the impact analysis portion.

3. The non-transitory computer-readable medium of claim 1, further comprising program code that is executable by the processing device for causing the processing device to:
based on determining that the other override value conflicts with the particular constraint of the one or more predefined constraints, discard the other override value without updating the aggregated time-series projection or the plurality of time series.

4. The non-transitory computer-readable medium of claim 1, further comprising program code that is executable by the processing device for causing the processing device to:
receive a plurality of constraints for at least one of (i) the aggregated time-series projection or (ii) the plurality of time series used to form the aggregated time-series projection;
determine a conflict between the plurality of constraints based on boundaries defined by the plurality of constraints; and
provide a visual notification indicating a recommendation for resolving the conflict; or
automatically resolve the conflict by relaxing at least one constraint in the plurality of constraints.

5. The non-transitory computer-readable medium of claim 1, further comprising program code that is executable by the processing device for causing the processing device to adjust the aggregated time-series projection using the override value by:
modifying the plurality of time series subject to a plurality of constraints to arrive at a new value for the data point, wherein the new value is different from the override value; and
replacing the existing value for the data point with the new value for the data point to generate the updated version of the aggregated time-series projection.

6. The non-transitory computer-readable medium of claim 1, and further comprising program code that is executable by the processing device for causing the processing device to:
receive, via the graphical user-interface, another user input indicating that a time series is to be locked, wherein the time series is (i) the aggregated time-series projection or (ii) a particular time series within the plurality of time series used to form the aggregated time-series projection; and
based on receiving the other user input, lock the time series such that the time series cannot be modified.

7. The non-transitory computer-readable medium of claim 1, further comprising program code that is executable by the processing device for causing the processing device to:
receive another plurality of override values for a particular data point in the aggregated time-series projection or the plurality of time series;
determine an average value of the other plurality of override values;
apply one or more constraints to the average value to determine an updated value for the particular data point, the updated value for the particular data point being different from the average value of the plurality of override values;
generate an adjusted version of the particular data point by replacing a value for the particular data point with the updated value; and
adjust the aggregated time-series projection based on the adjusted version of the particular data point.

8. The non-transitory computer-readable medium of claim 1, wherein the one or more relationships between the aggregated time-series projection and the plurality of time series is a non-hierarchical relationship.

9. The non-transitory computer-readable medium of claim 1, wherein the graphical user-interface includes a data table having values of data points in the aggregated time-series projection depicted in the graph, wherein the input element is a cell in the data table, and further comprising program code that is executable by the processing device for causing the processing device to adjust the aggregated time-series projection using the override value by replacing the existing value of the data point in the aggregated time-series projection with the override value.

10. The non-transitory computer-readable medium of claim 1, wherein:
visually presenting the impact analysis portion of the graphical user-interface includes visually hiding the graph and visually displaying a data table in the graphical user-interface, the data table depicting the respective impacts of overriding the existing value of the data point with the override value on each time series in the plurality of time series; and
the override value includes a new value or a value range for the data point in the aggregated time-series projection.

11. A system comprising:
a processing device; and
a memory device comprising program code that is executable by the processing device for causing the processing device to:
  generate a graphical user-interface (GUI) that includes:
    a graph depicting an aggregated time-series projection over a future period of time, the aggregated time-series projection being generated at least in part by aggregating a plurality of time series;
    an input element for receiving user input associated with a data point in the aggregated time-series projection;
    a GUI object for presenting an impact analysis portion of the graphical user-interface;
  receive the user input via the input element of the GUI, the user input indicating that an existing value for the data point in the aggregated time-series projection is to be overridden with an override value that is different from the existing value of the data point;
  based on receiving the user input via the input element:
    adjust the aggregated time-series projection using the override value for the data point to generate an updated version of the aggregated time-series projection;
    render an updated version of the graph in the GUI, wherein the updated version of the graph visually depicts the updated version of the aggregated time-series projection; and
    update data points in the plurality of time series by propagating an impact of overriding the existing value of the data point with the override value through the plurality of time series based on respective relationships between the aggregated time-series projection and the plurality of time series; and
  based on detecting a user interaction with the GUI object, visually present the impact analysis portion of the graphical user-interface, the impact analysis portion visually representing respective impacts of overriding the existing value of the data point with the override value on each time series in the plurality of time series, the respective impacts being visually represented at the same time within the impact analysis portion;
  receive another user input indicating that another value for another data point in the aggregated time-series projection is to be overridden with another override value;
  determine that the other override value conflicts with a particular constraint of one or more predefined constraints; and
  generate, in the GUI, a table that includes a plurality of statuses for a plurality of override values provided as user inputs and associated with different dates, each status in the plurality of statuses indicating whether a corresponding override value in the plurality of override values conflicts with at least one constraint of the one or more predefined constraints, wherein the table includes a status indicating that the other override value conflicts with the particular constraint of the one or more predefined constraints.

12. The system of claim 11, wherein the memory device further comprises program code that is executable by the processing device for causing the processing device to:
  receive a plurality of constraints; and
  responsive to receiving the plurality of constraints, update values of a plurality of data points in the plurality of time series by adjusting the values subject to the plurality of constraints;
  wherein the impact analysis portion of the graphical user-interface visually indicates respective influences of the plurality of constraints on the values of the plurality of data points, the respective influences being visually indicated at the same time in the impact analysis portion.

13. The system of claim 11, wherein the memory device further comprises program code that is executable by the processing device for causing the processing device to:
  based on determining that the other override value conflicts with the particular constraint of the one or more predefined constraints, discard the other override value without updating the aggregated time-series projection or the plurality of time series.

14. The system of claim 11, wherein the memory device further comprises program code that is executable by the processing device for causing the processing device to:
  receive a plurality of constraints for at least one of (i) the aggregated time-series projection or (ii) the plurality of time series used to form the aggregated time-series projection;
  determine a conflict between the plurality of constraints based on boundaries defined by the plurality of constraints; and
  provide a visual notification indicating a recommendation for resolving the conflict; or
  automatically resolve the conflict by relaxing at least one constraint in the plurality of constraints.

15. The system of claim 11, wherein the memory device further comprises program code that is executable by the processing device for causing the processing device to adjust the aggregated time-series projection using the override value by:
  modifying the plurality of time series subject to a plurality of constraints to arrive at a new value for the data point, wherein the new value is different from the override value; and
  replacing the existing value for the data point with the new value for the data point to generate the updated version of the aggregated time-series projection.

16. The system of claim 11, wherein the memory device further comprises program code that is executable by the processing device for causing the processing device to:
  receive, via the graphical user-interface, another user input indicating that a time series is to be locked, wherein the time series is (i) the aggregated time-series projection or (ii) a particular time series within the plurality of time series used to form the aggregated time-series projection; and
  based on receiving the other user input, lock the time series such that the time series cannot be modified.

17. The system of claim 11, wherein the memory device further comprises program code that is executable by the processing device for causing the processing device to:
  receive another plurality of override values for a particular data point in the aggregated time-series projection or the plurality of time series;
  determine an average value of the plurality of other override values;
  apply one or more constraints to the average value to determine an updated value for the particular data point, the updated value for the particular data point being different from the average value of the plurality of override values;

generate an adjusted version of the particular data point by replacing a value for the particular data point with the updated value; and adjust the aggregated time-series projection based on the adjusted version of the particular data point.

18. The system of claim 11, wherein the one or more relationships between the aggregated time-series projection and the plurality of time series is a non-hierarchical relationship.

19. The system of claim 11, wherein the graphical user-interface includes a data table having values of data points in the aggregated time-series projection depicted in the graph, wherein the input element is a cell in the data table, and wherein the memory device further comprises program code that is executable by the processing device for causing the processing device to adjust the aggregated time-series projection using the override value by replacing the existing value of the data point in the aggregated time-series projection with the override value.

20. The system of claim 11, wherein:
visually presenting the impact analysis portion of the graphical user-interface includes visually hiding the graph and visually displaying a data table in the graphical user-interface, the data table depicting the respective impacts of overriding the existing value of the data point with the override value on each time series in the plurality of time series; and
the override value includes a new value or a value range for the data point in the aggregated time-series projection.

21. A method comprising:
generating, by a processing device, a graphical user-interface (GUI) that includes:
a graph depicting an aggregated time-series projection over a future period of time, the aggregated time-series projection being generated at least in part by aggregating a plurality of time series;
an input element for receiving user input associated with a data point in the aggregated time-series projection;
a GUI object for presenting an impact analysis portion of the graphical user-interface;
receiving, by the processing device, the user input via the input element of the GUI, the user input indicating that an existing value for the data point in the aggregated time-series projection is to be overridden with an override value that is different from the existing value of the data point;
based on receiving the user input via the input element:
adjusting, by the processing device, the aggregated time-series projection using the override value for the data point to generate an updated version of the aggregated time-series projection;
rendering, by the processing device, an updated version of the graph in the GUI, wherein the updated version of the graph visually depicts the updated version of the aggregated time-series projection; and
updating, by the processing device, data points in the plurality of time series by propagating an impact of overriding the existing value of the data point with the override value through the plurality of time series based on respective relationships between the aggregated time-series projection and the plurality of time series; and based on detecting a user interaction with the GUI object, visually presenting, by the processing device, the impact analysis portion of the graphical user-interface, the impact analysis portion visually representing respective impacts of overriding the existing value of the data point with the override value on each time series in the plurality of time series, the respective impacts being visually represented at the same time within the impact analysis portion;

receiving, by the processing device, another user input indicating that another value for another data point in the aggregated time-series projection is to be overridden with another override value;

determining, by the processing device, that the other override value conflicts with a particular constraint of one or more predefined constraints; and generating, by the processing device and in the GUI, a table that includes a plurality of statuses for a plurality of override values provided as user inputs and associated with different dates, each status in the plurality of statuses indicating whether a corresponding override value in the plurality of override values conflicts with at least one constraint of the one or more predefined constraints, wherein the table includes a status indicating that the other override value conflicts with the particular constraint of the one or more predefined constraints.

22. The method of claim 21, further comprising:
receiving a plurality of constraints; and
responsive to receiving the plurality of constraints, updating values of a plurality of data points in the plurality of time series by adjusting the values subject to the plurality of constraints;
wherein the impact analysis portion of the graphical user-interface visually indicates respective influences of the plurality of constraints on the values of the plurality of data points, the respective influences being visually indicated at the same time in the impact analysis portion.

23. The method of claim 21, further comprising:
based on determining that the other override value conflicts with the particular constraint of the one or more predefined constraints, discarding the other override value without updating the aggregated time-series projection or the plurality of time series.

24. The method of claim 21, further comprising:
receiving a plurality of constraints for at least one of (i) the aggregated time-series projection or (ii) the plurality of time series used to form the aggregated time-series projection;
determining a conflict between the plurality of constraints based on boundaries defined by the plurality of constraints; and
providing a visual notification indicating a recommendation for resolving the conflict; or
automatically resolving the conflict by relaxing at least one constraint in the plurality of constraints.

25. The method of claim 21, further comprising adjusting the aggregated time-series projection using the override value by:
modifying the plurality of time series subject to a plurality of constraints to arrive at a new value for the data point, wherein the new value is different from the override value; and
replacing the existing value for the data point with the new value for the data point to generate the updated version of the aggregated time-series projection.

26. The method of claim 21, further comprising:
receiving, via the graphical user-interface, another user input indicating that a time series is to be locked, wherein the time series is (i) the aggregated time-series projection or (ii) a particular time series within the plurality of time series used to form the aggregated time-series projection; and
based on receiving the other user input, locking the time series such that the time series cannot be modified.

27. The method of claim 21, further comprising:
receiving another plurality of override values for a particular data point in the aggregated time-series projection or the plurality of time series;
determining an average value of the other plurality of override values;
applying one or more constraints to the average value to determine an updated value for the particular data point, the updated value for the particular data point being different from the average value of the plurality of override values;
generating an adjusted version of the particular data point by replacing a value for the particular data point with the updated value; and
adjusting the aggregated time-series projection based on the adjusted version of the particular data point.

28. The method of claim 21, wherein the one or more relationships between the aggregated time-series projection and the plurality of time series is a non-hierarchical relationship.

29. The method of claim 21, wherein the graphical user-interface includes a data table having values of data points in the aggregated time-series projection depicted in the graph, wherein the input element is a cell in the data table, and further comprising adjusting the aggregated time-series projection using the override value by replacing the existing value of the data point in the aggregated time-series projection with the override value.

30. The method of claim 21, wherein:
visually presenting the impact analysis portion of the graphical user-interface includes visually hiding the graph and visually displaying a data table in the graphical user-interface, the data table depicting the respective impacts of overriding the existing value of the data point with the override value on each time series in the plurality of time series; and
the override value includes a new value or a value range for the data point in the aggregated time-series projection.

* * * * *